(12) United States Patent
Tung et al.

(10) Patent No.: US 7,956,961 B2
(45) Date of Patent: Jun. 7, 2011

(54) PIXEL STRUCTURE, DISPLAY PANEL, ELECTRO-OPTICAL APPARATUS AND MANUFACTURING METHOD OF THE SAME

(75) Inventors: Chun-Hao Tung, Hsinchu (TW);
Kuo-Yu Huang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 496 days.

(21) Appl. No.: 12/111,929

(22) Filed: Apr. 29, 2008

(65) Prior Publication Data
US 2009/0180066 A1 Jul. 16, 2009

(30) Foreign Application Priority Data
Jan. 15, 2008 (TW) .................................. 97101472 A

(51) Int. Cl.
*G02F 1/1335* (2006.01)

(52) U.S. Cl. ........................................ 349/113; 349/114
(58) Field of Classification Search .................. 349/113, 349/114
See application file for complete search history.

(56) References Cited

U.S. PATENT DOCUMENTS

| 6,806,928 B2 | 10/2004 | Nagayama | |
| 2007/0177077 A1* | 8/2007 | Hong et al. | 349/114 |

* cited by examiner

*Primary Examiner* — Wen-Ying P Chen
(74) *Attorney, Agent, or Firm* — Jianq Chyun IP Office

(57) ABSTRACT

A pixel structure disposed on a substrate having a plurality of protrudent patterns is provided. An area where the protrudent patterns are disposed defines a first display area. The arrangement of the protrudent patterns forms a plurality of arc loci. The arc loci have a same arc center disposed at a corner of the first display area. The abovementioned protrudent patterns avails improvement of a displaying effect of the pixel structure.

43 Claims, 14 Drawing Sheets

PIXEL STRUCTURE, DISPLAY PANEL, ELECTRO-OPTICAL APPARATUS AND MANUFACTURING METHOD OF THE SAME

CROSS-REFERENCE TO RELATED APPLICATION

This application claims the priority benefit of Taiwan application serial no. 97101472, filed on Jan. 15, 2008. The entirety the above-mentioned patent application is hereby incorporated by reference herein and made a part of specification.

BACKGROUND OF THE INVENTION

1. Field of the Invention

The present invention relates to a pixel structure, a display panel, an electro-optical apparatus, and manufacturing methods thereof. More particularly, the present invention relates to a pixel structure, a display panel, an electro-optical apparatus respectively having protrudent patterns, and manufacturing methods thereof.

2. Description of Related Art

Generally, a transflective liquid crystal display (LCD) panel is mainly composed of an active device array substrate, a color filter substrate, and a liquid crystal layer disposed between the above-mentioned two substrates. The transflective LCD panel may achieve a display effect by simultaneously utilizing a backlight source and an external light source, and therefore a relatively good display effect may be achieved by the transflective LCD panel under different ambient light intensity environments. In the transflective LCD panel, a pixel structure of the active device array substrate has a transmissive area and a reflective area for respectively providing a transmissive display mode and a reflective display mode.

Generally, during fabrication of the transflective LCD panel with a good reflectivity, a plurality of protrudent patterns is fabricated in the reflective area. Such protrudent patterns may also be applied to a reflective LCD panel. In a conventional fabrication process, when the plurality of protrudent patterns is fabricated, two photo-mask processes are generally performed to form a plurality of bumps. Next, after a baking process, surfaces of the bumps may be smoothed to form the protrudent patterns.

The process of forming the protrudent patterns base on two photo-mask processes and two photolithography processes elongates a time of fabricating the whole LCD panel. Moreover, in a conventional design, the protrudent patterns are irregularly arranged in the reflective area, by which the improvement of the reflectivity is limited. In addition, the conventional pixel structure provides a relatively wide display viewing angle in certain directions and relatively narrow display viewing angle in other directions. Therefore, the display effects provided by the conventional pixel structure with the irregularly arranged protrudent patterns and the display panel using the same is still required to be improved.

SUMMARY OF THE INVENTION

The present invention is directed to a pixel structure, which may provide a good reflectivity.

The present invention is directed to a display panel, in which a reflective area has a good reflectivity and may present a good uniformity of a display viewing angle.

The present invention is directed to a method for fabricating a display panel, by which the display panel with a good reflectivity and uniformed display viewing angle may be fabricated.

The present invention is directed to an electro-optical apparatus, which has a good reflective display effect.

The present invention is directed to a method for fabricating an electro-optical apparatus, by which the aforementioned electro-optical apparatus may be fabricated.

The present invention provides a pixel structure disposed on a substrate. The pixel structure has a plurality of protrudent patterns. An area where the protrudent patterns are located defines a first display area, and an arrangement of the protrudent patterns approximately forms a plurality of arc loci, wherein the arc loci have a same arc center disposed at a corner of the first display area.

The present invention provides a display panel including a first substrate, a second substrate, a display media layer, and a plurality of pixel structures. The second substrate and the first substrate are disposed in parallel. The display media layer is disposed between the first substrate and the second substrate. The pixel structures are disposed on the first substrate, and each of the pixel structures has a plurality of protrudent patterns. An area where the protrudent patterns are located defines a first display area, and an arrangement of the protrudent patterns approximately forms a plurality of arc loci. Moreover, the arc loci have a same arc center disposed at a corner of the first display area.

In an embodiment of the present invention, the arc center in each of the pixel structures and the arc center in one of an adjacent pixel structure are located at different corners of the first display area.

In an embodiment of the present invention, a total area of the protrudent patterns of the pixel structures substantially occupies 18%~25% of a total area of the first display area.

In an embodiment of the present invention, each of the first display areas is substantially a rectangle and has a first corner, a second corner, a third corner, and a fourth corner. The first corner is located opposite to the third corner, and the second corner is located opposite to the fourth corner. In two adjacent pixel structures, the arc centers thereof may be located at the opposite corners in the corresponding pixel structure. Moreover, in four pixel structures, the arc centers thereof may be respectively located at the first corner, the second corner, the third corner, and the fourth corner.

In an embodiment of the present invention, a curvature radius of each of the arc loci is n*d, where n is a natural number greater than zero, and d is a distance between the arc center thereof and the adjacent arc lotus.

In an embodiment of the present invention, at least one protrudent pattern is arranged in each of the arc loci, and a distance between the protrudent patterns respectively on two adjacent arc loci is d.

In an embodiment of the present invention, each of the pixel structures includes a scan line, a data line, an active device, a first pixel electrode, and a first dielectric layer. The data line and the scan line are intersected. The active device is electrically connected to the scan line and the data line. The first pixel electrode is electrically connected to the active device. The first pixel electrode is conformally disposed on the first dielectric layer. The first dielectric layer has the protrudent patterns, and the first dielectric layer has a first film thickness and a second film thickness substantially less than the first film thickness, such that a difference between the first film thickness and the second film thickness substantially equals to a height of the protrudent patterns. The first pixel electrode may be a reflective pixel electrode or a transmissive pixel electrode. Each of the pixel structures further includes a second pixel electrode electrically connected to the active device, and the second pixel electrode defines a second display area. Moreover, the first dielectric layer may further be disposed between the second pixel electrode and the first substrate. A part of the first dielectric layer covered by the second pixel electrode has approximately the same the first film thickness or the second film thickness.

In an embodiment of the present invention, each of the pixel structures further includes a second dielectric layer disposed between the first dielectric layer and the first pixel electrode, and the second dielectric layer and the first dielectric layer are conformal.

In an embodiment of the present invention, each of the pixel structures includes a scan line, a data line, an active device, and a first pixel electrode. The data line and the scan line are intersected. The active device is electrically connected to the scan line and the data line. The first pixel electrode is electrically connected to the active device, and a part of the first pixel electrodes forms the protrudent patterns.

In an embodiment of the present invention, each of the pixel structures includes a scan line, a data line, an active device, a first pixel electrode, and a capacitor electrode. The data line and the scan line are intersected. The active device is electrically connected to the scan line and the data line. The first pixel electrode is electrically connected to the active device. The capacitor electrode is disposed between the first substrate and the first pixel electrode, and a part of the capacitor electrode forms the protrudent patterns.

In an embodiment of the present invention, the display panel further includes an additional dielectric layer disposed between the second substrate and the display media layer. The additional dielectric layer is located at the first display area, and is adapted to adjust a thickness of the display media layer located above the first pixel electrode.

In an embodiment of the present invention, the display panel further includes at least a spacer disposed between the first substrate and the second substrate.

The present invention provides a method for fabricating a display panel. The method is as follows. First, a first substrate is provided. Next, a plurality of pixel structures is formed on a first substrate, each of the pixel structures has a plurality of protrudent patterns, and an area where the protrudent patterns are located defines a first display area, and an arrangement of the protrudent patterns approximately forms a plurality of arc loci, wherein the arc loci have a same arc center disposed at a corner of the first display area. Next, a second substrate is provided. Finally, a display media layer is disposed between the first substrate and the second substrate.

In an embodiment of the present invention, the method of forming the pixel structures includes disposing the arc center in the pixel structures and the arc center in one of an adjacent pixel structure at different corners of the corresponding first display area.

In an embodiment of the present invention, the method of forming the pixel structures is as follows. First, a scan line and a data line are formed on the first substrate, and the data line and the scan line are intersected. An active device is formed on the first substrate, and the active device is electrically connected to the scan line and the data line. A first dielectric layer is formed on the first substrate, and the first dielectric layer has the protrudent patterns, and the first dielectric layer has a first film thickness and a second film thickness substantially less than the first film thickness, such that a difference between the first film thickness and the second film thickness substantially equals to a height of the protrudent patterns. A first pixel electrode is formed on the first substrate, the first pixel electrode is electrically connected to the active device, and is conformally disposed on the first dielectric layer.

In an embodiment of the present invention, the method of forming the first dielectric layer is as follows. A dielectric material layer is formed on the first substrate. A patterning process is performed by utilizing a half-tone mask adapted patterning the dielectric material layer, wherein the half-tone mask has an opaque area, a transparent area, and a partially transparent area. The transparent area is located above a part of the active device. The opaque area and the partially transparent area are located within the first display area. The dielectric material layer located below the opaque area is patterned to form the protrudent patterns. While performing the patterning process, a simulation test pattern is further formed on the first substrate. Moreover, transmissivity of the partially transparent area is substantially between 10%~30%.

In an embodiment of the present invention, the method of forming the pixel structures further includes forming a second dielectric layer between the first dielectric layer and the first pixel electrode, and the second dielectric layer and the first dielectric layer are conformal.

In an embodiment of the present invention, the method of forming the pixel structures further includes forming a second pixel electrode on the first substrate, the second pixel electrode is electrically connected to the active device, and the second pixel electrode defines a second display area.

In an embodiment of the present invention, one of the transparent area and the opaque area of the half-tone mask is further located above the second display area.

In an embodiment of the present invention, the partially transparent area of the half-tone mask is further located above the second display area.

In an embodiment of the present invention, the method for fabricating the display panel further includes forming an additional dielectric layer on the second substrate, and the additional dielectric layer is located within the first display area.

In an embodiment of the present invention, the method of forming the pixel structures is as follows. A scan line and a data line are formed on the first substrate, and the data line and the scan line are intersected. An active device is formed on the first substrate, and the active device is electrically connected to the scan line and the data line. A first pixel electrode is formed on the first substrate, and the first pixel electrode is electrically connected to the active device. A capacitor electrode is formed on the first substrate, the capacitor electrode is located between the first pixel electrode and the first substrate, and a part of the capacitor electrode forms the protrudent patterns.

In an embodiment of the present invention, the method for fabricating the display panel further includes forming at least a spacer between the first substrate and the second substrate.

The present invention provides an electro-optical apparatus including the aforementioned display panel.

The present invention provides a method for fabricating an electro-optical apparatus, in which the aforementioned fabrication method of the display panel is included.

In summary, in the present invention, a plurality of the protrudent patterns is applied to the pixel structures, and arrangement of the protrudent patterns is in accordance with certain rules, and therefore the pixel structures and the display panel thereof may have a good reflectivity and a good uniformity of display viewing angle. Moreover, fabrication of the protrudent patterns by applying the half-tone mask avails simplification of the fabrication steps thereof, and reliability of the fabrication process may be improved by applying the simulation test pattern. In brief, the pixel structure, the display panel and the electro-optical apparatus having the same of the present invention may have a better display effect and a better fabrication reliability.

In order to make the aforementioned and other objects, features and advantages of the present invention comprehensible, a preferred embodiment accompanied with figures is described in detail below.

DESCRIPTION OF EMBODIMENTS

Figure 1:
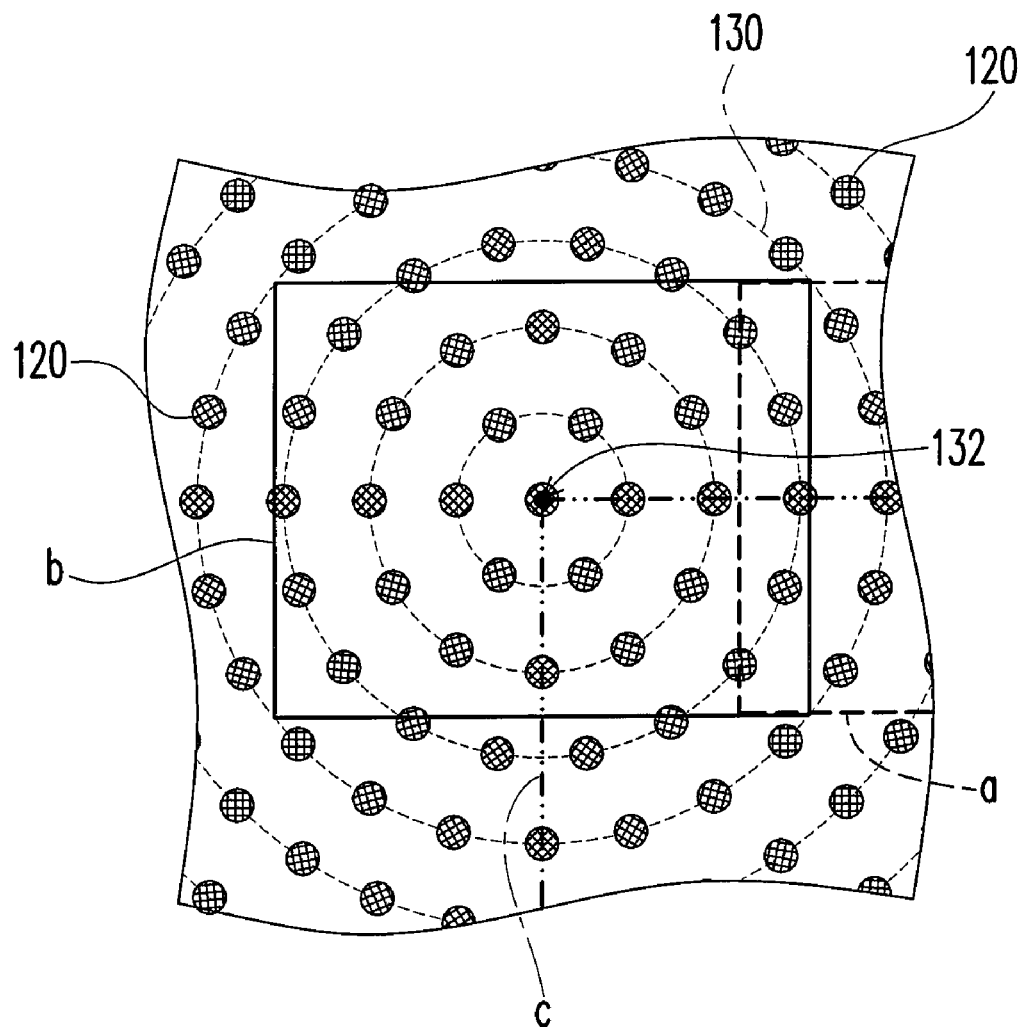
FIG. 1 is schematic diagram illustrating a design of regularly arranged protrudent patterns.

Since improvement of a reflectivity of a reflective display mode based on pixel structures with irregularly arranged protrudent patterns is limited, the present invention provides a design of regularly arranged protrudent patterns shown as FIG. 1. Referring to FIG. 1, the protrudent patterns 120 are approximately arranged along a plurality of arc loci 130, and the arc loci 130 have a same arc center 132 (i.e. a circle center). When the protrudent patterns 120 are applied to the pixel structures or a display panel having a reflective or a micro reflective display design, it avails improvement of the reflectivity of the pixel structures or the display panel. Actually, if the protrudent patterns 120 are arranged in different densities, different display effects of the pixel structures may be provided. Therefore, in the present invention, the protrudent patterns 120 within different areas a, b, and c actually applied to the pixel structures are compared and described in detail.

Figure 2A:
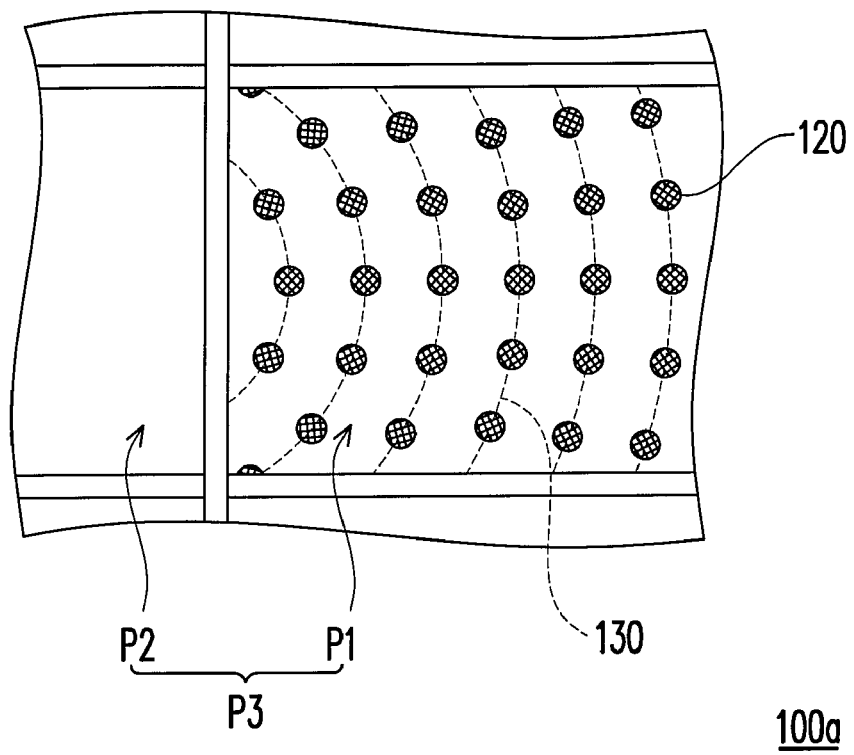
FIGS. 2A~2C are respectively partial top views of three pixel structures.
Figure 2B:
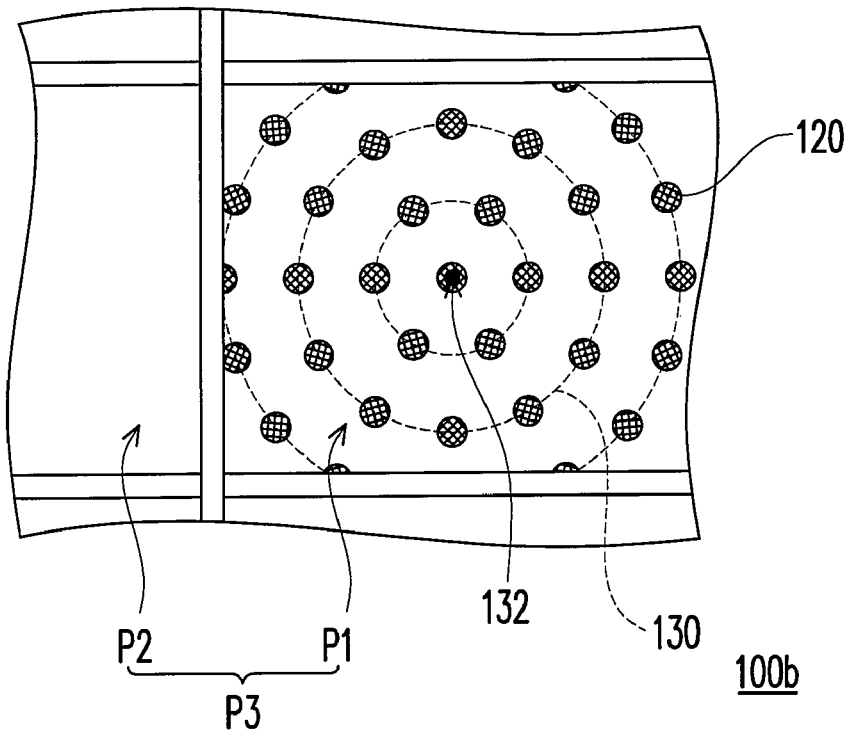
Figure 2C:
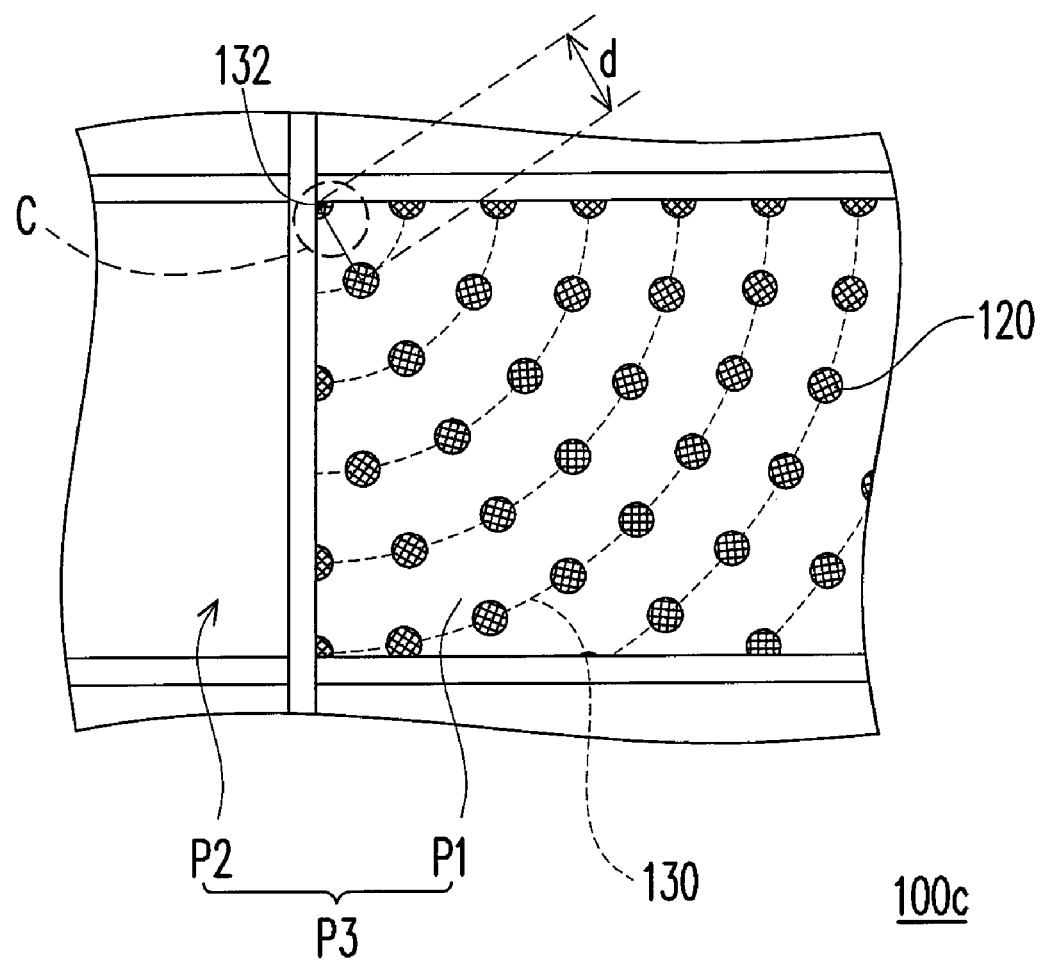

FIGS. 2A~2C are sectional top views of three pixel structures. Referring to FIG. 2A first, a pixel structure 100a may have an image display area P3 including a first display area P1 (or referred to as a first pixel area) and a second display area P2 (or referred to as a second pixel area), wherein the first display area P1 and the second display area P2 are assumed to be separated by a conductive line (not shown), though the present invention is not limited thereof. In other embodiments, only the first display area P1 or the second display area P2 may be included in the pixel structure 100a, or the first display area P1 and the second display area P2 may be simultaneously included in the pixel structure 100a, and the first display area P1 and the second display area P2 may be separated by the conductive line (not shown). At least one of the first display area P1 and the second display area P2 can be shown in a reflective display mode, a micro reflective display mode, or a transmissive display mode. In the present invention, assuming the first display area P1 is shown in the reflective display mode, and the second display area P2 may be shown in the transmissive display mode, though the present invention is not limited thereof. Moreover, the pixel structure 100a has a plurality of the protrudent patterns 120, and an arrangement method of the protrudent patterns 120 is as that shown in the area a of FIG. 1. Namely, the same arc center 132 of the arc loci 130 formed by the protrudent patterns 120 is located outside the first display area P1.

The reflectivity of the pixel structure 100a is substantially 32.11% after being actually measured. Since a ratio between an area of the first display area P1 within the pixel structure 100a and the area of the image display area P3 is substantially 60.32%. If the actually measured reflectivity 32.11% is divided by the ratio 60.32% which represents the ratio between the area of the first display area P1 and the area of the image display area P3, a value I of 53.23% is then obtained, which represents a reflectivity per unit display area provided by the protrudent patterns 120.

Next, referring to FIG. 2B, the arrangement principle the protrudent patterns 120 of the first display area P1 of a pixel structure 100b is as that shown in the area b of FIG. 1, and other descriptions thereof is the same as that of FIG. 2A. It should be noted that in the pixel structure 100b, the same arc center 132 of the arc loci 130 formed by the protrudent patterns 120 is assumed to be located at the center of the display area P1 of the pixel structure 100b, though the present invention is not limited thereto, the arc center 132 may also be located at other positions except for corners of the first display area P1 of the pixel structure 100b. The reflectivity of the pixel structure 100b is substantially 18.38% after being actually measured. In the pixel structure 100b, the ratio between the area of the first display area P1 and the area of the image display area P3 is substantially 27.74%. Therefore, if the actually measured reflectivity 18.38% is divided by the ratio 27.74% which represents the ratio between the area of the first display area P1 and the area of the image display area P3, a value II of 66.26% is then obtained. Namely, a reflectivity per unit display area provided by the protrudent patterns 120 is substantially 66.26% when the protrudent patterns 120 are arranged as that shown in FIG. 2b.

Next, referring to FIG. 2C, the arrangement principle the protrudent patterns 120 of the first display area P1 of a pixel structure 100c is as that shown in the area c of FIG. 1, and other descriptions thereof is the same as that of FIG. 2A. It should be noted that the same arc center 132 of the arc loci 130 formed by the protrudent patterns 120 is assumed to be located at one of corners C of the display area P1 of the pixel structure 100c, though the present invention is not limited thereto, the arc center 132 may also be located on other corners of the first display area P1, and the corner position may be determined according to a shape of the first display area P1, for example, a rectangle, a quadrilateral, a pentagon, a rhombus, a hexagon, or other suitable shapes. The reflectivity of the pixel structure 100c is substantially 25.87% after being actually measured, wherein the ratio between the area of the first display area P1 and the area of the image display area P3 is substantially 34%. Therefore, after the actually measured reflectivity 25.87% is divided by the ratio 34% which represents the ratio between the area of the first display area P1 and the area of the image display area P3, a value III of 76.09% is then obtained, wherein the value III represents a reflectivity per unit display area provided by the protrudent patterns 120.

To fully compare an effectiveness of the reflectivities generated due to different arrangement of the protrudent patterns 120, the value III is taken as a standard for normalizing the values I, II, and III. The normalized value I is substantially 69.69%, the normalized value II is substantially 87.08%, and the normalized value III is substantially 100%. Therefore, it is obvious that when the same arc center 132 of the arc loci 130 formed by the protrudent patterns 120 is located at the corner C of the first display area P1, a better reflectivity thereof may be provided, namely, the pixel structure 100c illustrated in FIG. 2C may provide a better reflective display effect.

Therefore, the present invention provides the pixel structure 100c as shown in FIG. 2C for providing the better reflective display effect. In the pixel structure 100c, an area where the protrudent patterns 120 are located approximately defines the first display area P1, though the present invention is not limited thereof, the first display area P1 may be exchanged to the second display area P2, or both of the first display area P1 and the second display area P2 may be simultaneously defined. Here, the first display area P1 is for example a reflective display area, though the present invention is not limited thereof. In the present embodiment, a total area of the protrudent patterns 120 substantially occupies 18%~25% of the area of the first display area P1, though the present invention is not limited thereto. Preferably, the total area of the protrudent patterns 120 substantially occupies 20%~22% of the area of the first display area P1. Moreover, curvature radius of each of the arc loci 130 is n*d, where n is a natural number greater than zero, and d is a distance between the arc center 132 and an adjacent arc lotus 130, shown as FIG. 2C. In other words, the curvature radius of each of the arc loci 130 is a multiple of the distance d. In FIG. 2C, n is assumed to be a positive integer, though the present invention is not limited thereof. Moreover, at leas one protrudent pattern 120 is arranged in each of the arc loci 130, and a distance between the protrudent patterns respectively on each of the loci 130 is substantially d.

It should be noted that the pixel structure 100c of the present invention may not only be applied to a transflective display design, but may also be applied to a reflective display design. Alternatively, the protrudent patterns 120 may also be applied to the pixel structure with a transmissive display design for providing the effect of micro reflection. In other words, application of the arrangement of the protrudent patterns 120 on the pixel structure 100c is not limited to the aforementioned display designs. Therefore, the arrangement of the protrudent patterns 120 shown as FIG. 2C may be applied to any display design that displays images based on a reflection principle.

In the following content, the protrudent patterns 120 and the pixel structure 100c applying to different display designs (for example the transflective display design, the reflective display design, or the micro reflective display design) or different film layers (for example the dielectric layer or a metal layer) are described with reference of drawings. Wherein, the arrangement principle of the protrudent patterns 120 is shown as FIG. 2C. However, the arc center 132 of the arc loci 130 formed by the protrudent patterns 120 may also be located at other three corners (not shown), which is not limited by the present invention.

First Embodiment

Figure 3A:
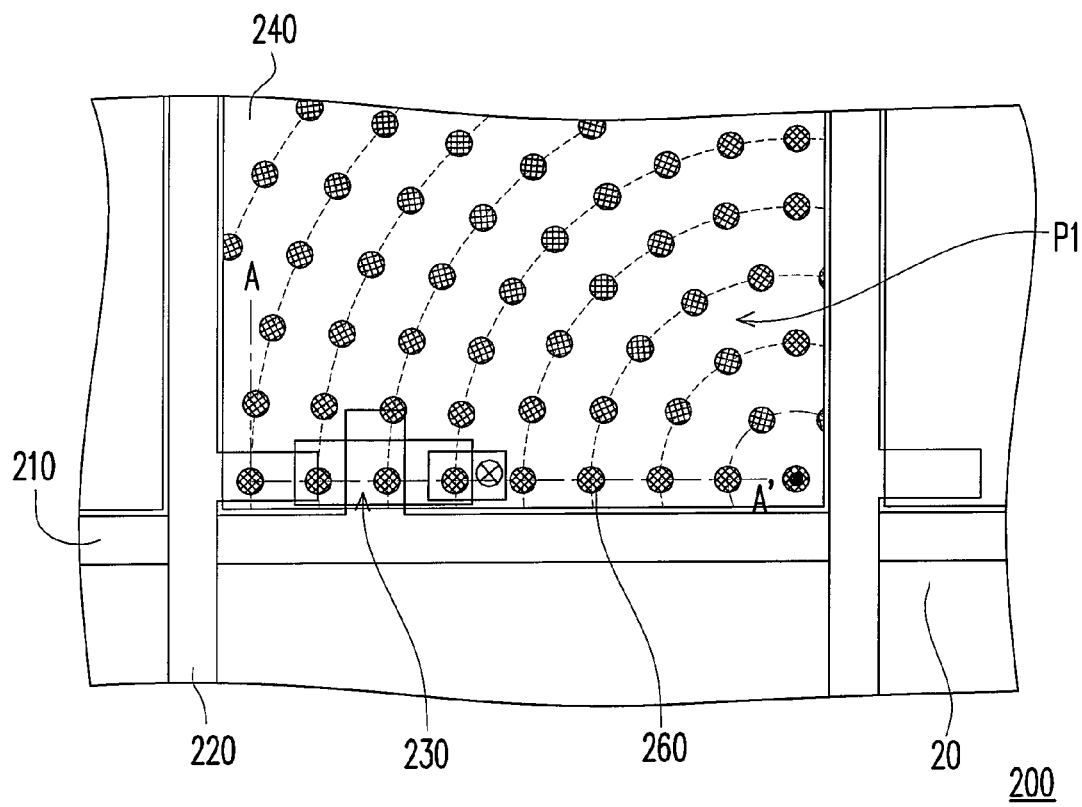
FIG. 3A is a sectional top view of a pixel structure according to a first embodiment of the present invention.
Figure 3B:
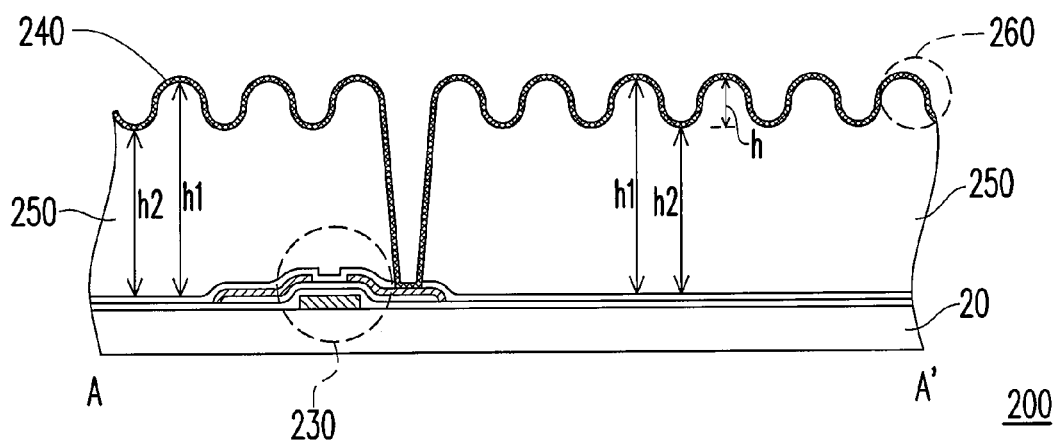
FIG. 3B is a cross-sectional view of a pixel structure of FIG. 3A cutting along a section line AA'.

FIG. 3A is a sectional top view of a pixel structure according to a first embodiment of the present invention. FIG. 3B is a cross-sectional view of a pixel structure of FIG. 3A cutting along a section line AA'. Referring to FIG. 3A and FIG. 3B, a pixel structure 200 disposed on a substrate 20 includes a scan line 210, a data line 220, at least an active device 230, a first pixel electrode 240, and a first dielectric layer 250.

As shown in FIG. 3A, the data line 220 and the scan line 210 are intersected. The active device 230 is electrically connected to the scan line 210 and the data line 220. The first pixel electrode 240 is electrically connected to the active device 230. The data line 220 and the scan line 210 may be a single layer structure or multi layer structure, and materials thereof may be gold, silver, copper, stannum, lead, hafnium, tungsten, molybdenum, neodymium, titanium, tantalum, aluminium, zinc, alloys thereof, metal oxides thereof, metal nitrides thereof, or combinations thereof. Moreover, the first pixel electrode 240 may be the single layer structure or the multi layer structure, and the material thereof corresponds to different display designs of the pixel structure 200. For example, the first pixel electrode 240 may be a reflective electrode, and the material thereof may be a reflective conductive material such as gold, silver, copper, stannum, lead, hafnium, tungsten, molybdenum, neodymium, titanium, tantalum, aluminium, zinc, alloys thereof, metal oxides thereof, metal nitrides thereof, or combinations thereof. Moreover, the first pixel electrode 240 may also be made of a transparent conductive material such as indium-tin oxide, indium-zinc oxide, indium-tin-zinc oxide, hafnium oxide, zinc oxide, aluminium oxide, aluminium-tin oxide, aluminium-zinc oxide, cadmium-tin oxide, cadmium-zinc oxide, or combinations thereof. Alternatively, the first pixel electrode 240 may also simultaneously comprise the reflective conductive material and the transparent conductive material. Therefore, the material of the first pixel electrode 240 is not limited by the present invention.

Moreover, the protrudent patterns 260 are assumed to be formed on the first dielectric layer 250, and the arrangement method of the protrudent patterns 260 is shown as FIG. 3A, though the present embodiment is not limited thereto. Moreover, as shown in FIG. 3B, the first dielectric layer 250 has a first film thickness h1 and a second film thickness h2 substantially less than the first film thickness h1, so that a difference between the first film thickness h1 and the second film thickness h2 substantially equals to a height h of the protrudent patterns 260. In other words, the protrudent patterns 260 are formed by the first dielectric layer 250. Moreover, the first pixel electrode 240 is conformally disposed on the first dielectric layer 250, shown as FIG. 3B. In the present embodiment, the first dielectric layer 250 may be the single layer structure or the multi layer structure, and the material thereof may be organic materials, inorganic materials, or combinations thereof, wherein the organic materials may be photoresist, benzocyclobutene, cycloalkenes, polyimides, polyamides, polyesters, polyalcohols, polyethylene oxides, polyphenylenes, resins, polyethers, polyketide, or other materials, or combinations thereof. In the present embodiment, the organic material of the photoresist is taken as an example, though the present embodiment is not limited thereto, and the inorganic material such as silicon oxide, silicon nitride, silicon oxide nitride, other suitable materials, or combinations thereof may also be applied.

In another embodiment, the pixel structure 200 further includes a second dielectric layer (not shown) disposed between the first dielectric layer 250 and the first pixel electrode 240, wherein the second dielectric layer (not shown) and the first dielectric layer 250 are conformal. The second dielectric layer (not shown) may be the single layer structure of the multi layer structure, and the material thereof may be the inorganic materials (such as silicon oxide, silicon nitride, silicon oxide nitride, silicon carbide, hafnium oxide, aluminium oxide, or other materials, or combinations thereof) as example, though the present embodiment is not limited thereof, and the materials of the first dielectric layer 250 may also be applied in fabricating the second dielectric layer (not shown). Moreover, other dielectric layers (not shown) with or without a bumpy surface may also be disposed between the first dielectric layer 250 and the substrate 20, and the structure and material thereof may be the same to the first dielectric layer 250. Namely, one layer or multi layers of dielectric layer may be disposed between the first pixel electrode 240 and the substrate 20, wherein at least one layer (for example the first dielectric layer 240) of such one layer or multi layers of the dielectric layer has the protrudent patterns 260. Now, the first pixel electrode 240 conformally formed on the protrudent patterns 260 avails improvement of the reflectivity of the pixel structure 200. Moreover, in another embodiment, the protrudent patterns 260 may not be formed by the first dielectric layer 250 or other dielectric layers. For example, the protrudent patterns 260 may be formed by a part of the first pixel electrode 240 of the pixel structure 200. Namely, the first pixel electrode 240 may have the bumpy surface for forming the protrudent patterns 260.

It should be noted that the pixel structure 200 is just an example, and the pixel structure 200 may not only be applied to the display panel with the reflective display design, but may also be applied to the display panel with the transflective display design or other same or similar display designs.

In addition, referring to FIG. 3A and FIG. 3B, a method for fabricating the pixel structure 200 is as example follows. First, a scan line 210 and a data line 220 are formed on a substrate 20, and the scan line 210 is intersected with the data line 220. Wherein, the scan line 210 and the data line 220 may be formed based on a photolithography process, though the present embodiment is not limited thereto. Namely, other suitable processes may also be applied, such as screen printing, ink jet printing, laser stripping, or other suitable methods, or combinations thereof. Moreover, the scan line 210 and the data line 220 may be the single layer structure or the multi layer structure, and the material thereof may be gold, silver, copper, stannum, lead, hafnium, tungsten, molybdenum, neodymium, titanium, tantalum, aluminium, zinc, alloys thereof, metal oxides thereof, metal nitrides thereof, or combinations thereof.

Next, an active device 230 is formed on the substrate 20, wherein the active device 230 is electrically connected to the scan line 210 and the data line 220. Next, a first dielectric layer 250 is formed on the substrate 20, wherein the first dielectric layer 250 is assumed to have the protrudent patterns 260, and the first dielectric layer 250 has a first film thickness h1 and a second film thickness h2 substantially less than the first film thickness h1, so that a difference between the first film thickness h1 and the second film thickness h2 substantially equals to a height h of the protrudent patterns 260.

Figure 3C:
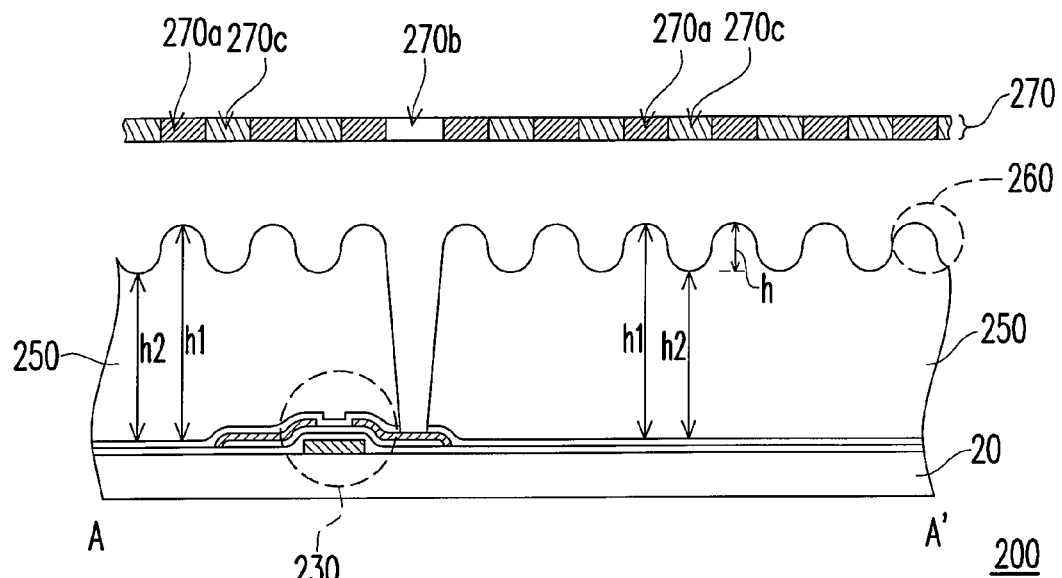
FIG. 3C is a diagram illustrating a method of forming a first dielectric layer on a pixel structure.

To be specific, FIG. 3C is a diagram illustrating a method of forming a first dielectric layer on a pixel structure. Referring to FIG. 3C, a dielectric material layer (not shown) is formed on the substrate 20. Next, preferably, a patterning process is performed by utilizing a half-tone mask 270 adapted patterning the dielectric material layer to be the first dielectric layer 250, wherein the half-tone mask 270 has an opaque area 270a, a transparent area 270b, and a partially transparent area 270c. The transparent area 270b is located above a part of the active device 230. The opaque area 270a and the partially transparent area 270c are located above the first display area P1. Actually, if the active device 230 is a thin film transistor, the transparent area 270b may be located above a drain (not shown) of the active device 230. After an exposing and a developing process, the dielectric material layer located below the opaque area 270a is then patterned and forms the different film thickness (h1 and h2).

Preferably, the transmissivity of the partially transparent area 270c is substantially between 10%~30%, though the present embodiment is not limited thereof. Since only a part of the light may penetrate the partially transparent area 270c, light energy received by the dielectric material layer (not shown) located below the partially transparent area 270c is relatively low, and therefore this part of dielectric material layer is only partially exposed. Therefore, a part of the first dielectric layer 250 which located below the partially transparent area 270c has the film thickness of h2, and another part of the first dielectric layer 250 which located below the opaque area 270a has the film thickness of h1. Moreover, the dielectric material layer (not shown) located below the transparent area 270b is completely exposed, so that the drain (not shown) of the active device 230 is exposed. In the present embodiment, a bottom gate of the active device 230 is taken as an example, though the present embodiment is not limited thereof, a top gate, or other suitable structures, or combinations thereof may also be applied.

Herein, the material of the dielectric material layer (not shown) is assumed to be a positive photoresist material, and if a negative photoresist material is applied to the dielectric material layer (not shown), distribution of the different areas 270a~270c on the half-tone mask 270 is then adjusted accordingly. Actually, the mask used for forming the first dielectric layer 250 may also be other types of masks, which is not limited to the half-tone mask 270. To be specific, compared to a conventional fabrication process applying two photo-mask processes and a baking process for fabricating the protrudent patterns 260, the patterning process utilizing the half-tone mask 270 of the present embodiment avails simplification of the fabrication process of the protrudent patterns 260 and may shorten a fabrication time thereof. Certainly, other fabrication processes may also be applied, for example, multiple exposure process using a general mask which only has the opaque area 270a and the transparent area 270b in the conventional fabrication, screen printing, ink jet printing, laser stripping, or other suitable processes, or combinations thereof.

Next, referring to FIG. 3B, a first pixel electrode 240 is formed on the substrate 20. The first pixel electrode 240 is electrically connected to the active device 230, and is conformally disposed on the first dielectric layer 250. Now, fabrication of the pixel structure 200 of the present embodiment is approximately completed.

Since the protrudent patterns 260 of the pixel structure 200 may be formed by stacking different film layers, the fabrication method of the pixel structure 200 further includes forming a second dielectric layer (not shown) conformal to the first dielectric layer 250 between the first dielectric layer 250 and the first pixel electrode 240. Certainly, other kind of dielectric layers with or without the bumpy surface may also be formed between the substrate 20 and the first pixel electrode 240 or between the substrate 20 and the dielectric layer 250. Moreover, fabrication process of the second dielectric layer and other dielectric layers may also be the same as one of the aforementioned fabrication process of the first dielectric layer 250.

Figure 3D:
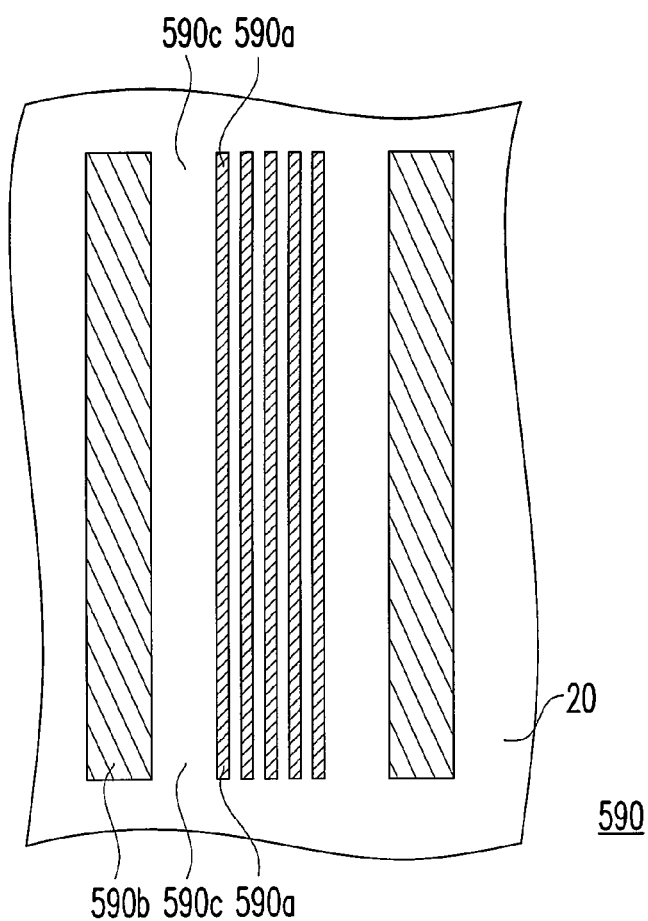
FIG. 3D is a diagram illustrating a simulation test pattern according to an embodiment of the present invention.

It should be noted that while performing the patterning process for forming the bumpy surface on the first dielectric layer 250, preferably, a simulation test pattern 590 is further formed on the substrate 20, shown as FIG. 3D. Referring to FIG. 3D, in the simulation test pattern 590, areas 590a, 590b and 590c respectively corresponds to the obtained patterning results below the opaque area 270a, the transparent area 270b, and the partially transparent area 270c of the half-tone mask 270. In the present embodiment, a scanner (for example, a α-step scanner) is adapted for scanning the simulation test pattern 590, so as to obtain a depth variation information of the patterned first dielectric layer 250. Since when the patterning process is performed to the dielectric material layer (not shown), variation trends of height and width of the protrudent patterns 260 cannot be obtained accurately. Therefore, in the present invention, during the fabrication process, the simulation test pattern 590 is simultaneously formed at the edge of the substrate 20 based on the same fabrication conditions for being utilized to adjust the fabrication conditions. Certainly, the simulation test pattern 590 may not be formed simultaneously during the formation of the pixel structure 200 or even the formation of the simulation test pattern 590 may be unnecessary, while the depth variation information of the patterned first dielectric layer 250 may be obtained based on other methods or instruments, for example, slicing, an optical profile scanner, a secondary electron microscopy (SEM), or other suitable method or combinations thereof.

Second Embodiment

Figure 4A:
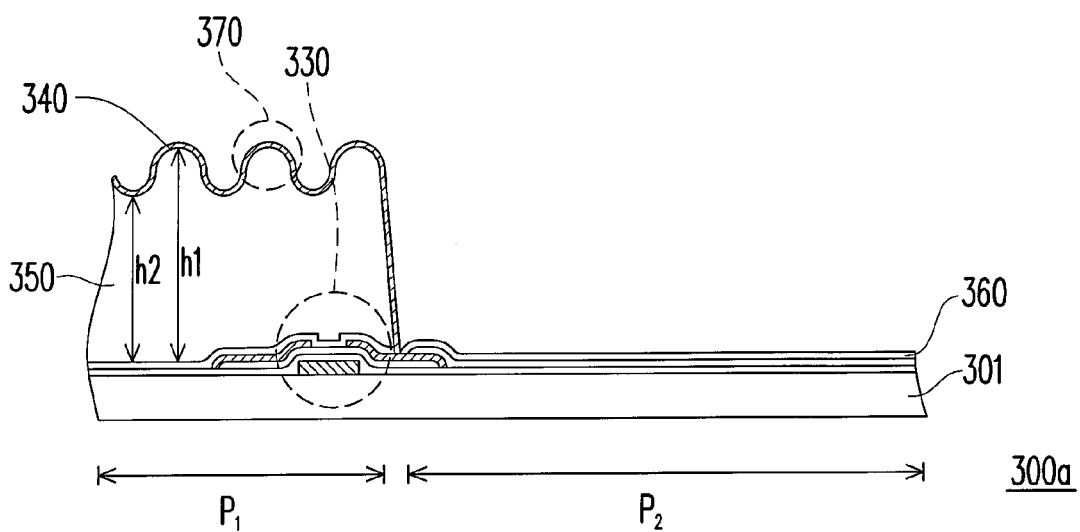
FIG. 4A is a partial cross-sectional view of a pixel structure according to a second embodiment of the present invention.

FIG. 4A is a cross-sectional view of a pixel structure according to a second embodiment of the present invention. Referring to FIG. 4A, a pixel structure 300a disposed on a substrate 30 includes an active device 330, a first pixel electrode 340, a first dielectric layer 350, and a second pixel electrode 360. Moreover, the pixel structure 300a has a plurality of protrudent patterns 370 defining a first display area P1. The second pixel electrode 360 defines a second display area P2. At least one of the first display area P1 and the second display area P2 is the transmissive display area, the reflective display area, the micro reflective display area, or combinations thereof. In the present embodiment, the first display area P1 is assumed to be the reflective display area and the second display area P2 is assumed to be the transmissive display area, though the present embodiment is not limited thereof.

In the present embodiment, the first dielectric layer 350 has the protrudent patterns 370, wherein the arrangement principle of the protrudent patterns 370 is approximately the same to that of the first embodiment shown in FIG. 3A, though the present embodiment is not limited thereof. Moreover, the first dielectric layer 350 is assumed to be only located at the first display area P1. In other embodiments, the first dielectric layer 350 may further be disposed between the second pixel electrode 360 and the substrate 30, namely, disposed within the second display area P2.

Figure 4B:
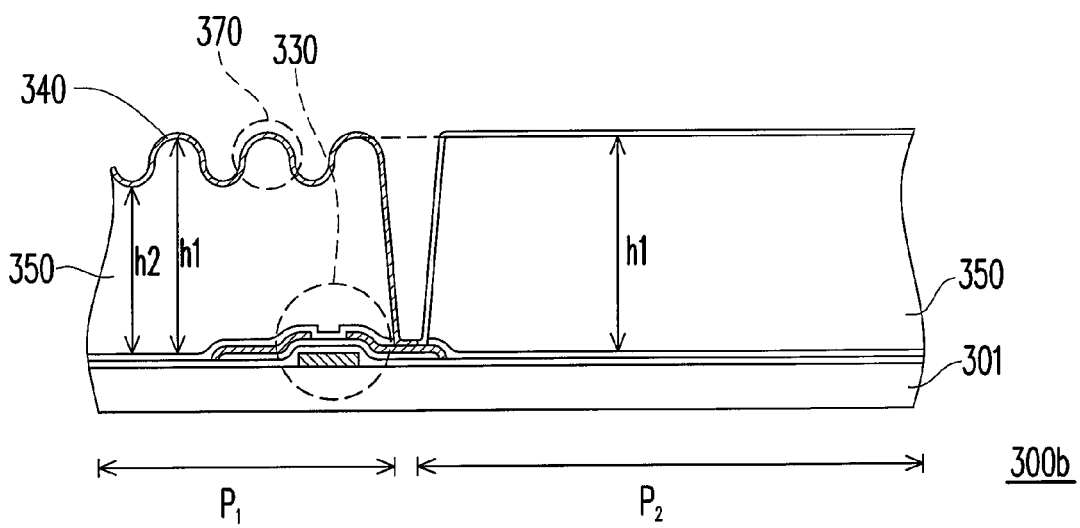
FIG. 4B and FIG. 4C are partial cross-sectional views of other two pixel structures according to a second embodiment of the present invention.
Figure 4C:
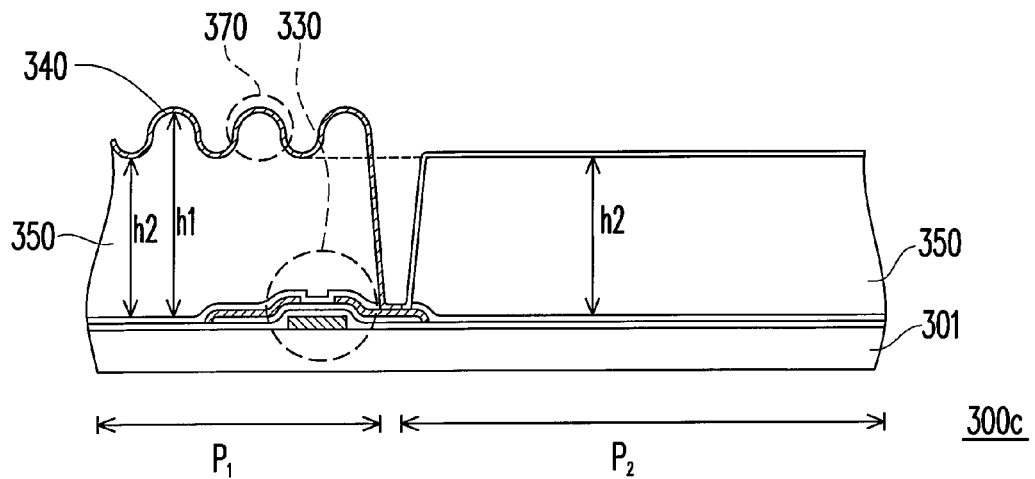

For example, FIG. 4B and FIG. 4C are cross-sectional views of other two kinds of pixel structures according to the second embodiment of the present invention. Referring to FIG. 4B and FIG. 4C, the pixel structures 300b and 300c are approximately the same to the pixel structure 300a, the difference there between is that a part of the first dielectric layer 350 is further disposed within the second display area P2. In FIG. 4B and FIG. 4C, the part of the first dielectric layer 350 that is covered by the second pixel electrode 360 has approximately the same first film thickness h1 and the second film thickness h2, respectively. Actually, the part of the first dielectric layer 350 that is covered by the second pixel electrode 360 may have a flat surface.

In detail, during a fabrication process, fabrication method of the pixel structures 300a~300c is approximately the same to that of the pixel structure 200, wherein the fabrication method of the pixel structures 300a~300c further includes a step of forming the second pixel electrode 360 on the substrate 30. Moreover, during fabrication of the first dielectric layer 350, if the second display area P2 is disposed under different areas of the half-tone mask, the three pixel structures 300a~300c shown as FIGS. 4A~4C are then respectively formed. Certainly, the present embodiment is not limited thereto, the three pixel structures 300a~300c shown as FIGS. 4A~4C may also be formed based on the aforementioned fabrication method.

For example, the material of the first dielectric layer 350 is assumed to be the positive photoresist material, and the first dielectric layer 350 is assumed to be formed by the patterning process based on a half-tone mask, though the present embodiment is not limited thereof. If the transparent area of the half-tone mask is disposed above the second display area P2, the corresponding positive photoresist material is then completely exposed and is removed during a developing process. Therefore, the first dielectric layer 350 is only located within the first display area P1, namely, a cross-sectional structure of the pixel structure 300a is formed. The opaque area and the partially transparent area of the half-tone mask are correspondingly disposed above the second display area P2, and therefore the positive photoresist material within this area may be partially or totally retained. Therefore, a part of the first dielectric layer 350 may be further disposed between the second pixel electrode 360 and the substrate 30. Now, if the opaque area is located above the second display area P2, the first dielectric layer 350 within the second display area P2 then has the first film thickness h1, as shown in FIG. 4B. Moreover, referring to FIG. 4C, if the partially transparent area is located above the second display area P2, after the exposing and the developing processes, the first dielectric layer 350 within the second display area P2 then has the second film thickness h2. In brief, if different areas of the mask are disposed above the second display area P2 to perform the exposing and the developing processes, the first dielectric layer 350 in the second display area P2 can be formed with different thickness.

Third Embodiment

Figure 5:
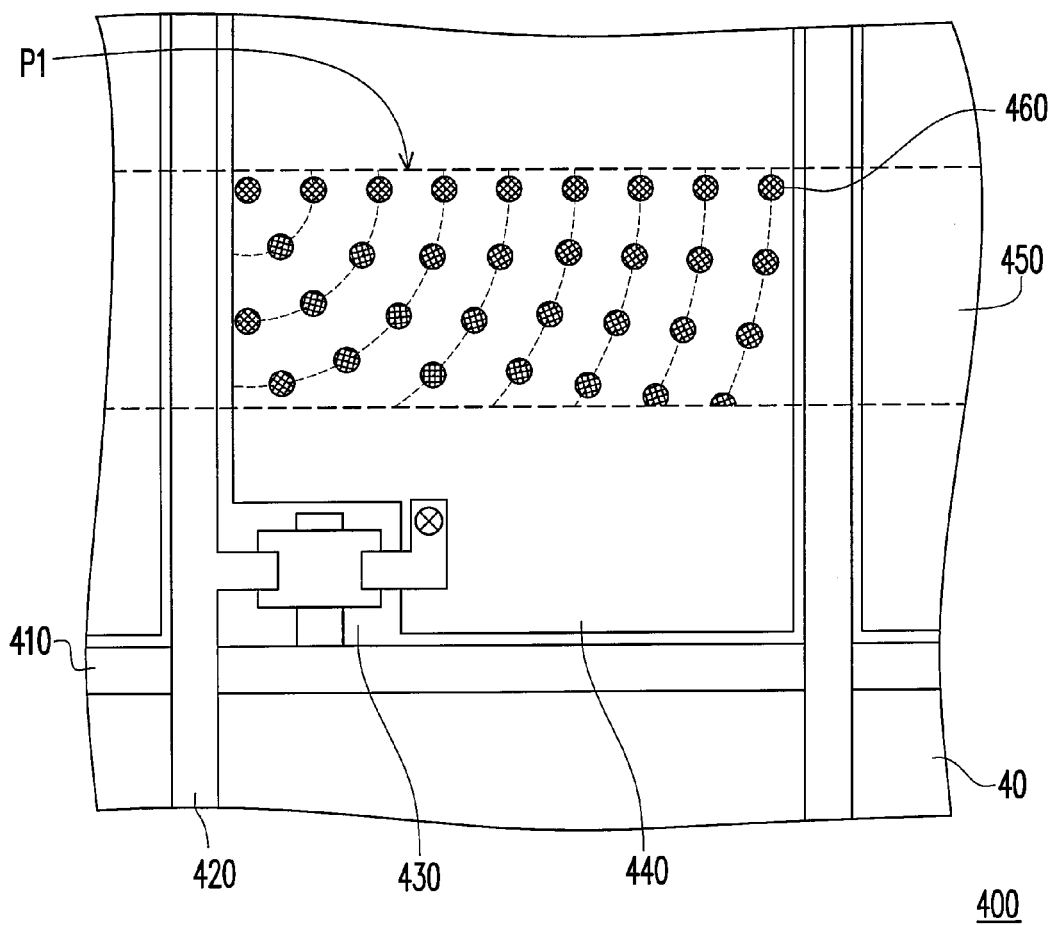
FIG. 5 is a top view of a pixel structure according to a third embodiment of the present invention.

FIG. 5 is a top view of a pixel structure according to a third embodiment of the present invention. Referring to FIG. 5, a pixel structure 400a disposed on a substrate 40 includes a scan line 410, a data line 420, an active device 430, a first pixel electrode 440 and a capacitor electrode 450. The data line 420 and the scan line 410 are intersected. The active device 430 is electrically connected to the scan line 410 and the data line 420. The first pixel electrode 440 is electrically connected to the active device 430. The capacitor electrode 450 is disposed between the substrate 40 and the first pixel electrode 440, and a part of the capacitor electrode 450 forms protrudent patterns 460. It should be noted that the arrangement of the protrudent patterns 460 is as that of the area c shown in FIG. 1 or FIG. 2C, though the present embodiment is not limited thereof, the top gate, or other suitable structures, or combinations thereof may also be applied in the design of the active device 430.

In the present embodiment, the material of the first pixel electrode 440 is assumed to be the transparent conductive material. Moreover, the pixel structure 400 may be commonly circled by the scan line 410 and the data line 420, as shown in FIG. 5. In other embodiments, disposing positions of the scan line 410 and the capacitor electrode 450 may be exchanged, so that a range of the pixel structure 400 may be defined by the capacitor electrode 450 and the data line 420. Generally, the pixel structure 400 has at leas one dielectric layer (not shown)

disposed between the capacitor electrode 450 and the first pixel electrode 440, and a storage capacitor is formed between the capacitor electrode 450 and the first pixel electrode 440.

Fabrication method of the pixel structure 400 is similar to that of the pixel structures 100c, 200, 300a~300c of the aforementioned embodiments, wherein the protrudent patterns 460 are located on a part of the capacitor electrode 450. To be specific, the protrudent patterns 460 may be directly formed on a surface of the capacitor electrode 450, or may be formed by the dielectric layer (not shown) located below or above the capacitor electrode 450. For example, if the storage capacitor is designed as metal-dielectric layer-metal (MIM) structure, and the capacitor electrode 450 functions as an upper electrode of the MIM structure, the dielectric layer (not shown) located below the capacitor electrode 450 then may have a bumpy surface, so that the capacitor electrode 450 may be conformally formed on the dielectric layer (not shown) to form the protrudent patterns 460. Alternatively, the capacitor electrode 450 may function as a lower electrode of the MIM structure, the dielectric layer (not shown) located above the capacitor electrode 450 or the surface of capacitor electrode 450 then may have the bumpy surface, so that the upper electrode of the MIM structure may be conformally formed on the dielectric layer (not shown) to form the protrudent patterns 460. Certainly, in another embodiment, if the design of the storage capacitor is metal-dielectric layer-transparent electrode layer (MII) structure, the protrudent patterns 460 then may be directly formed on the surface of the capacitor electrode 450, or may be formed by the dielectric layer (not shown) located above or below the capacitor electrode 450.

The protrudent patterns 460 on the capacitor electrode 450 may define the first display area P1. When the pixel structure 400 is used for display, the protrudent patterns 460 may provide a suitable reflective function for improving a display quality of the pixel structure 400. The pixel structure 400 may also be referred to as the pixel structure 400 having a micro reflective structure. Moreover, the capacitor electrode 450 may also be a part of the scan line 410 or other lines, and the formation of the protrudent patterns of the present embodiment is the same to the aforementioned description.

Figure 6A:
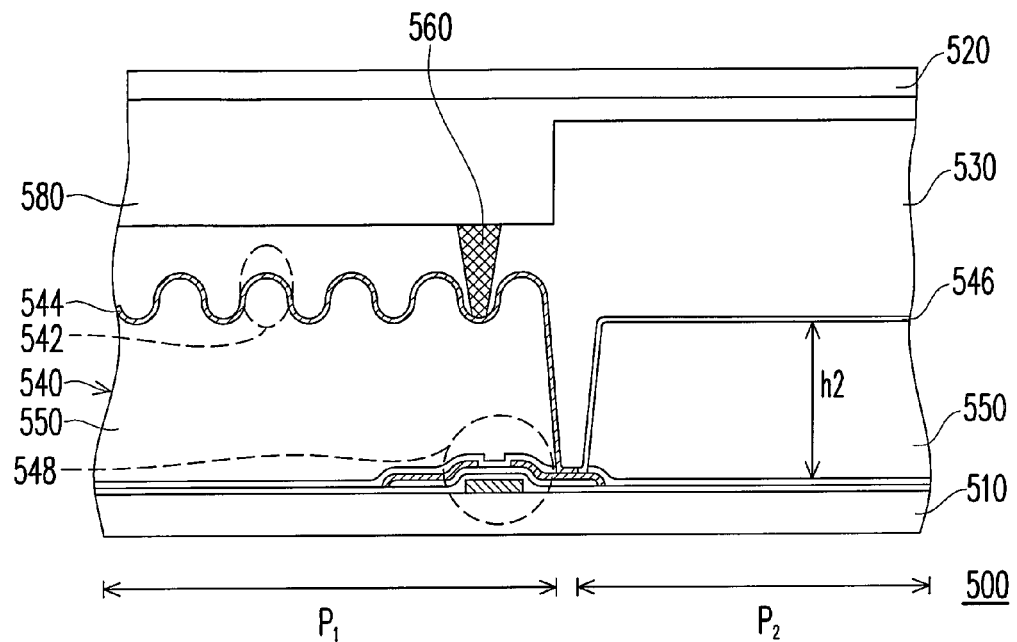
FIG. 6A is a cross-sectional view of a display panel according to an embodiment of the present invention.

FIG. 6A is a cross-sectional view of a display panel according to an embodiment of the present invention. Referring to FIG. 6A, a display panel 500 includes a first substrate 510, a second substrate 520, a display media layer 530, and a plurality of pixel structures 540. The second substrate 520 and the first substrate 510 are disposed in parallel. The display media layer 530 is disposed between the second substrate 520 and the first substrate 510. Wherein, material of the display medial layer 530 may be liquid crystal molecules or organic electro-luminescent material etc. The material of the display media layer 530 is not limited by the present invention, which may be selected according to a type of the display panel 500. In the present embodiment, the material of the display media layer 530 is assumed to be the liquid crystal molecules, namely, the display panel 500 is a liquid crystal display (LCD) panel.

In the present embodiment, the pixel structure 540 is disposed on the first substrate 510, and the pixel structure 540 has a plurality of protrudent patterns 542. To be specific, the pixel structure 540 includes a first pixel electrode 544, a second pixel electrode 546, an active device 548, and at least one dielectric layer 550. The first pixel electrode 544 conformally covers the protrudent patterns 542. An area where the protrudent patterns 542 are located defines a first display area P1, and the second pixel electrode 546 defines a second display area P2. At least one of the first display area P1 and the second display area P2 is the transmissive display area, the reflective display area, the micro reflective display area, or the combinations thereof. In the present embodiment, the first display area P1 is assumed to be the reflective display area and the second display area P2 is assumed to be the transmissive display area, though the present embodiment is not limited thereof. Namely, the first pixel electrode 544 on the first display area P1 may be a reflective electrode conformally covering the dielectric layer 550 for providing a good reflectivity. Therefore, design of the pixel structure 540 avails improvement of the display effect of the display panel 500. Herein, the pixel structure 540 is assumed to be similar to the pixel structure 300c shown as FIG. 4C. In other embodiments, the pixel structure 540 may also be at least one of the pixel structures 100a~100c, 200, 300a~300c and 400 of the aforementioned embodiments. Namely, the pixel structure 540 may be applied to the reflective design, the transmissive design, the transflective design, or the micro reflective design.

The display panel 500 further includes at least a spacer 560. The spacer 560 is disposed between the first substrate 510 and the second substrate 520 is adapted to maintain and modulate a distance there between. Moreover, the spacer 560 may be a ball-shaped spacer, a photo spacer, or combinations thereof. In the present embodiment, the photo spacer is taken as an example, though the present embodiment is not limited thereof. In addition, in the present embodiment, the spacer 560 is preferably disposed on the second substrate 520, though the present embodiment is not limited thereof, the spacer 560 may also be disposed on the first substrate 510 or simultaneously on the first substrate 510 and the second substrate 520. A position where the spacer 560 contacts the first substrate 510 is located at a concave part (not shown) between two adjacent protrudent patterns. Preferably, a flat part may be disposed at the position where the spacer 560 contacts the first substrate 510 and located between two adjacent protrudent patterns, though the present embodiment is not limited thereof. Height of the flat part is determined by the thickness of the dielectric layer located there below. For example, when the dielectric layer 550 is located at both the first display area P1 and the second display area P2, preferably, the height of the flat part is substantially greater than or substantially equal to an average thickness of the dielectric layer 550 in at least one of the first display area P1 and the second display area P2, so that the optical spacer may be relatively stable, though the present embodiment is not limited thereof. The height of the flat part may also be substantially less than the average thickness of the dielectric layer 550 in at least one of the first display area P1 and the second display area P2. If the dielectric layer 550 is only located at the first display area P1 as shown in FIG. 4A, and the dielectric layer 550 simultaneously has the first film thickness h1 and the second film thickness h2, the height of the flat part is preferable substantially greater than or substantially equal to the average thickness of the dielectric layer 550 located at the first display area P1, i.e. (h1+h2)/2, so that the spacer 560 may be relatively stable, though the present embodiment is not limited thereof. The height of the flat part may also be substantially less than the average thickness of the dielectric layer 550 located at the first display area P1, i.e. (h1+h2)/2.

In addition, in the present embodiment, the pixel structure 540 is assumed to have the transflective design. Therefore, to unify the display effects of the reflective display mode and the transmissive display mode, the display panel 500 further includes an additional layer 580 (or referred to as padding layer, stepping layer, or lifting layer). Preferably, the additional layer 580 is disposed between the second substrate 520 and the display media layer 530, and is located within the first display area P1 is adapted to adjust a thickness (i.e. a cell gap) of the display media layer 530 located above the first pixel electrode 544. In other embodiments, the additional layer 580 may also be disposed on the first substrate 510 and is located within the first display area P1, alternatively, the additional layer 580 may also be disposed simultaneously on the first substrate 510 and the second substrate 520 and is located within the first display area P1. Preferably, the material of the additional layer comprises organic dielectric material, but not limited to it. The inorganic dielectric material or others suitable materials can be used by the additional layer.

To be specific, a method for fabricating the display panel 500 is as follows. For example, first, the first substrate 510 is provided. Next, the plurality of pixel structures 540 is formed on the first substrate 510, wherein the fabrication method of the pixel structures 540 may be the same to one of the aforementioned methods, and therefore detailed description thereof is not repeated. Moreover, the second substrate 520 having color filters is provided, and the second substrate 520 is referred to as a color filter substrate, which is an example, and the present embodiment is not limited thereof. In other embodiments, the color filters may also be formed on the first substrate 510 and may be respectively referred to as color filter on array or array on color filter according to a position thereof that being located above the active device 548 or below the active device 548. Next, the display media layer 530 is formed between the first substrate 510 and the second substrate 520. If the display media layer 530 is the liquid crystal layer, the method of forming the display media layer 530 may be a one-drop filling method or a vacuum injection method etc. Certainly, different kinds of the display media layer 530 may have different fabrication method thereof, and the above description is only used for an example, and the present invention is not limited thereto.

The method for fabricating the display panel 500 further includes forming at least one spacer 560 between the first substrate 510 and the second substrate 520, wherein the method of forming the spacer 560 may be based on a photolithographic process or a spreading process. If the spacer 560 is the photo spacer, the photolithographic process is then applied for fabricating the spacer 560; and if the spacer 560 is the ball-shaped spacer, the spreading process is then applied for fabricating the spacer 560. Moreover, if the display panel 500 has the transflective design, the additional layer 580 is preferably formed on the second substrate 520, though the present embodiment is not limited thereof. In other embodiments, the additional layer 580 may also be disposed on the first substrate 510 and is located within the first display area P1, alternatively, the additional layer 580 may also be disposed simultaneously on the first substrate 510 and the second substrate 520, and is located within the first display area P1.

Figure 6B:
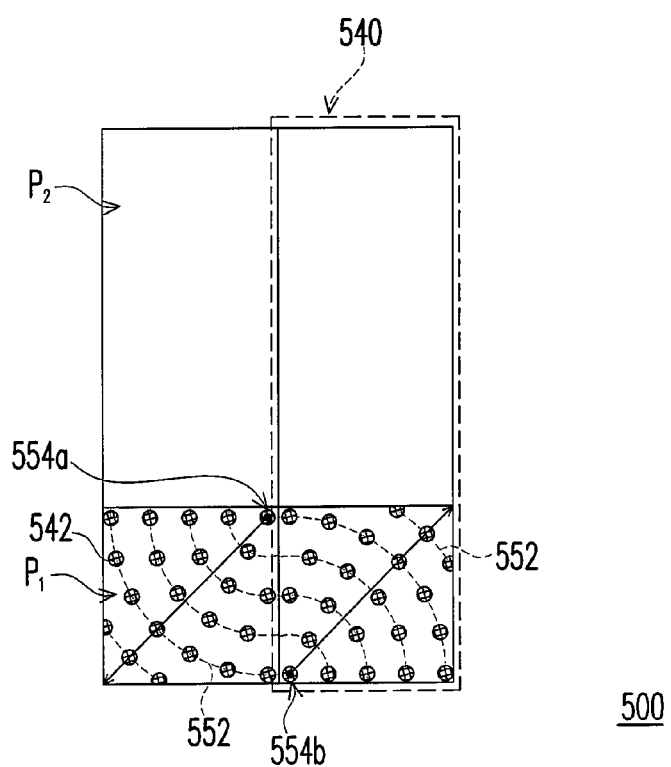
FIGS. 6B~6G are top views of different kinds of display panels according to the present invention.

According to a top view, the arrangement of the protrudent patterns 542 of the display panel 500 may have different designs. FIGS. 6B~6G are top views of different kinds of display panels according to the present invention. Referring to FIG. 6B first, the pixel structures 540 of the display panel 500 may be described in couples. In each of the pixel structures 540, the protrudent patterns 542 are arranged along a plurality of arc loci 552, and the arc loci 552 have the same arc centers 554a and 554b. In two adjacent pixel structures 540, positions of the two arc centers 554a and 554b of the arc loci 552 formed by the protrudent patterns 542 are located in two opposite corners as shown in FIG. 6B. Namely, for example, in one of the pixel structures 540, the arc center 554a of the arc loci 552 formed by the protrudent patterns 542 is located at a top-right corner of the first display area P1, and in another one of the pixel structures 540, the arc center 554b is located at a bottom-left corner of the first display area P1. In other embodiments, the arc centers 554a and 554b of the two adjacent pixel structures 540 are respectively located at a top-left corner and a bottom-right corner of the first display area P1.

When the two arc centers of the arc loci 552 formed by the protrudent patterns 542 are located at the two opposite corners of the corresponding first display area P1 of the two adjacent pixel structures 540, arrangement of the protrudent patterns 542 have opposite direction variations. Therefore, when the display panel 500 applies the reflective display mode, the display effect thereof in different viewing angles may be compensated. In other words, the protrudent patterns 542 designed based on the present invention may improve the reflectivity of the display panel 500 applying the reflective display mode. Furthermore, by suitably adjusting the arrangement of the protrudent patterns 542 within different pixel structures 540, display viewing angles of the display panel 500 in all directions may be uniformed. Namely, the display effect of the display panel 500 has better viewing angle uniformity.

Figure 6C:
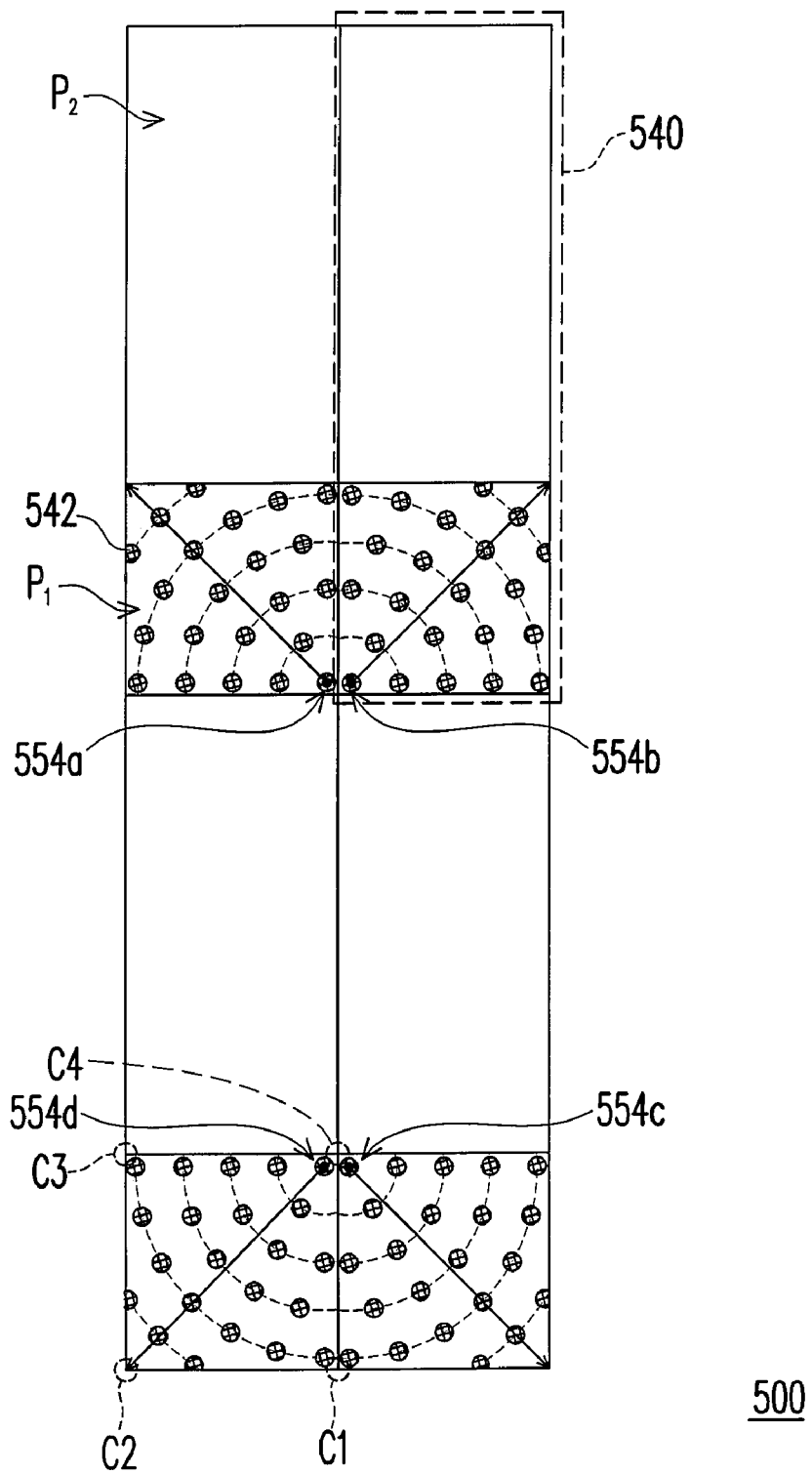
Figure 6D:
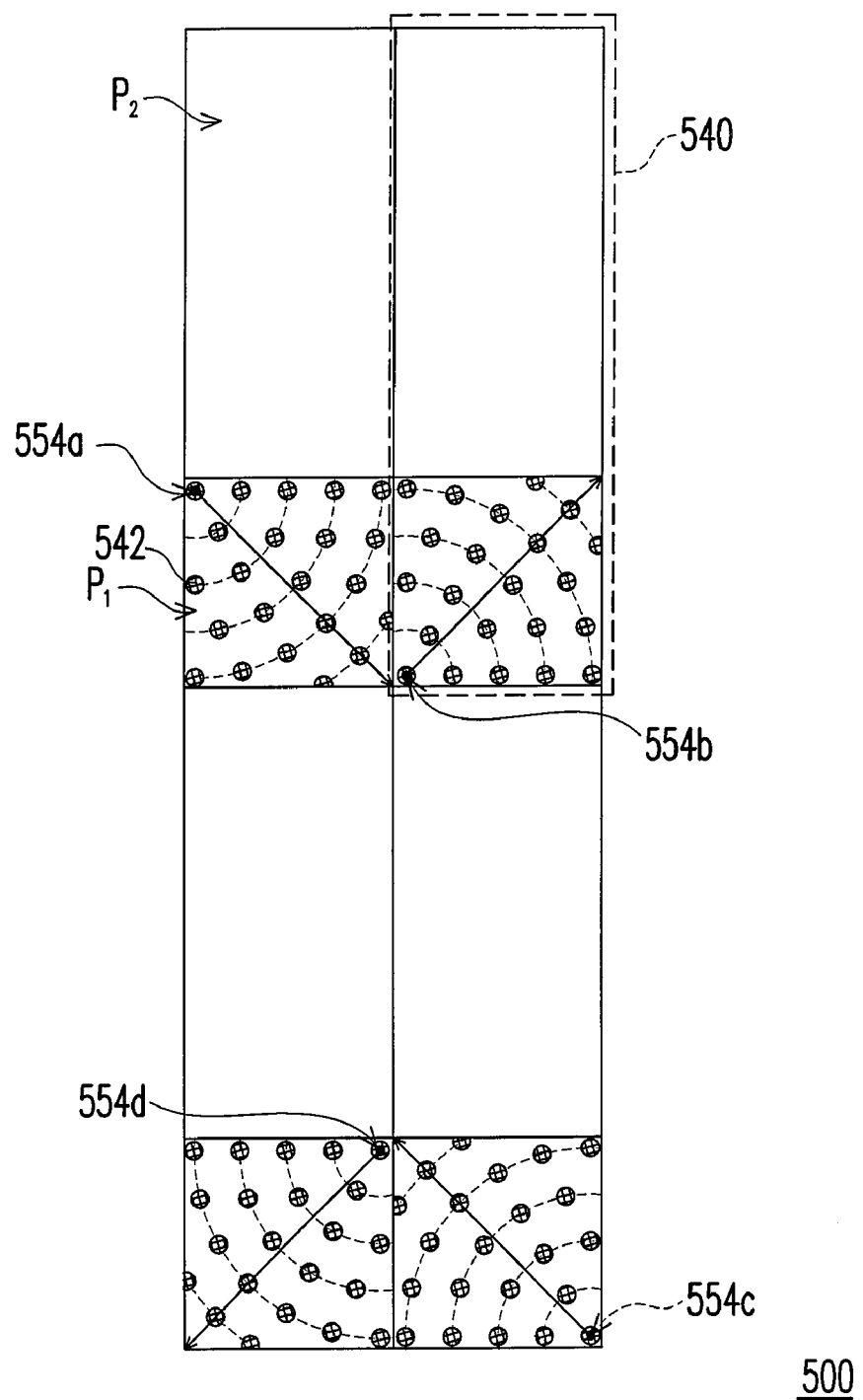

Next, referring to FIG. 6C and FIG. 6D, in the display panel 500, four pixel structures 540 may be considered as one group, for example, four closely arranged pixel structures 540 may be considered as one group for designing the arrangement of the protrudent patterns 542. In the four closely arranged pixel structures 540, the arc centers 554a~554d of the arc loci formed by the protrudent patterns 542 are respectively located at a first corner C1, a second corner C2, a third corner C3, and a fourth corner C4 of the first display area P1, as shown in FIG. 6C and FIG. 6D. For example, the first display P1 is approximately a rectangle, and the arc centers 554a~554d are respectively located at one of the corners of the rectangle. Now, in the grouped four pixel structures 540, direction variations of the arc loci 552 of the protrudent patterns 542 may be countervailed with each other. Therefore, display viewing angles of the display panel 500 in all directions may be uniformed. Referring to FIG. 6C the arc loci 552 of the protrudent patters 542 in two closely adjacent first display areas P1 further form a semi arc, and the arc loci 552 in two of the first display areas P1 arranged in row may be in a mirror symmetric manner. In FIG. 6D, the arc loci 552 of the protrudent patterns 542 have a following pattern, i.e. an end point of the direction variation of the arc loci 552 formed by the protrudent patterns 542 of a certain pixel structure is an initial point of the direction variation of the arc loci 552 formed by the protrudent patterns 542 of another pixel structure.

Figure 6E:
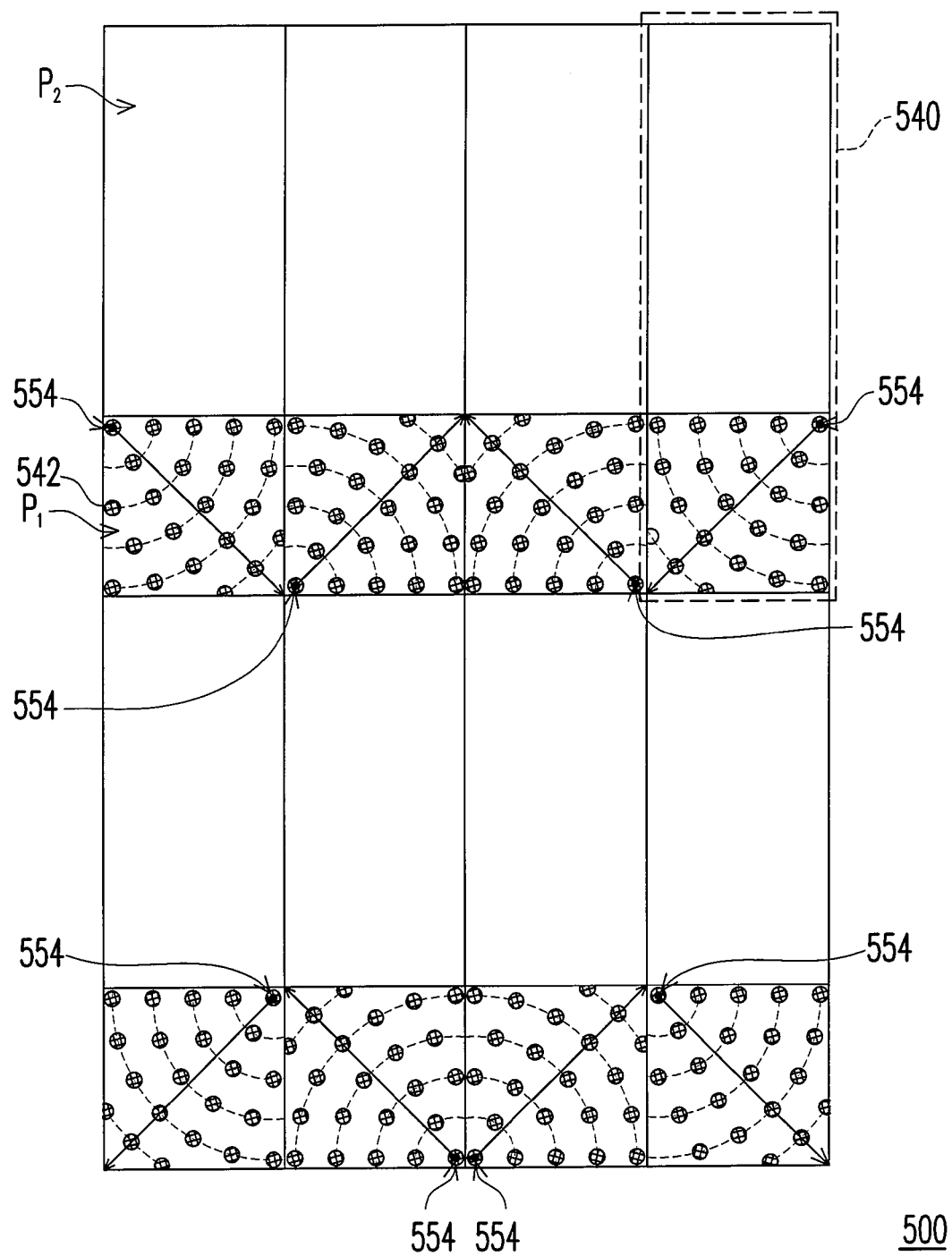
Figure 6F:
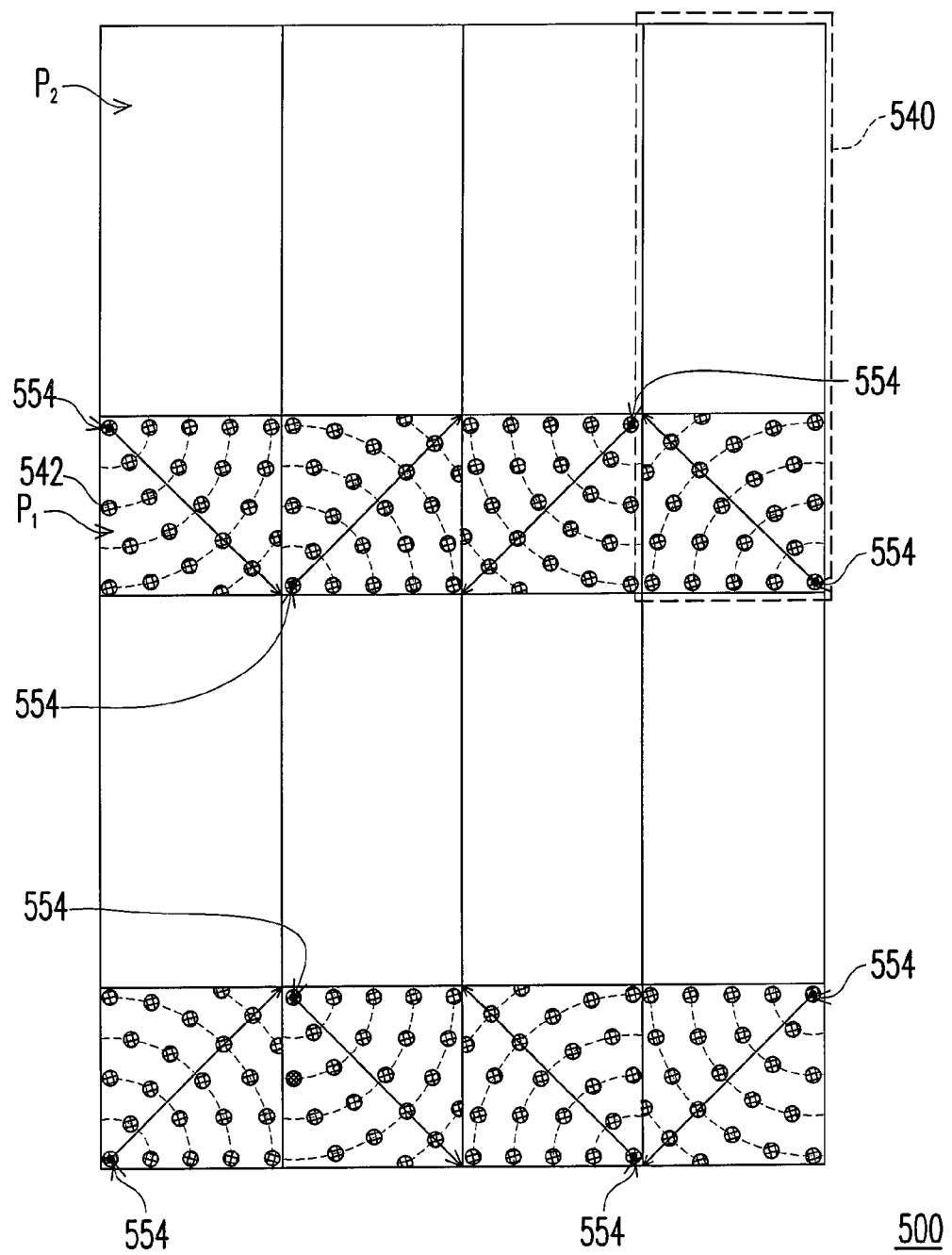
Figure 6G:
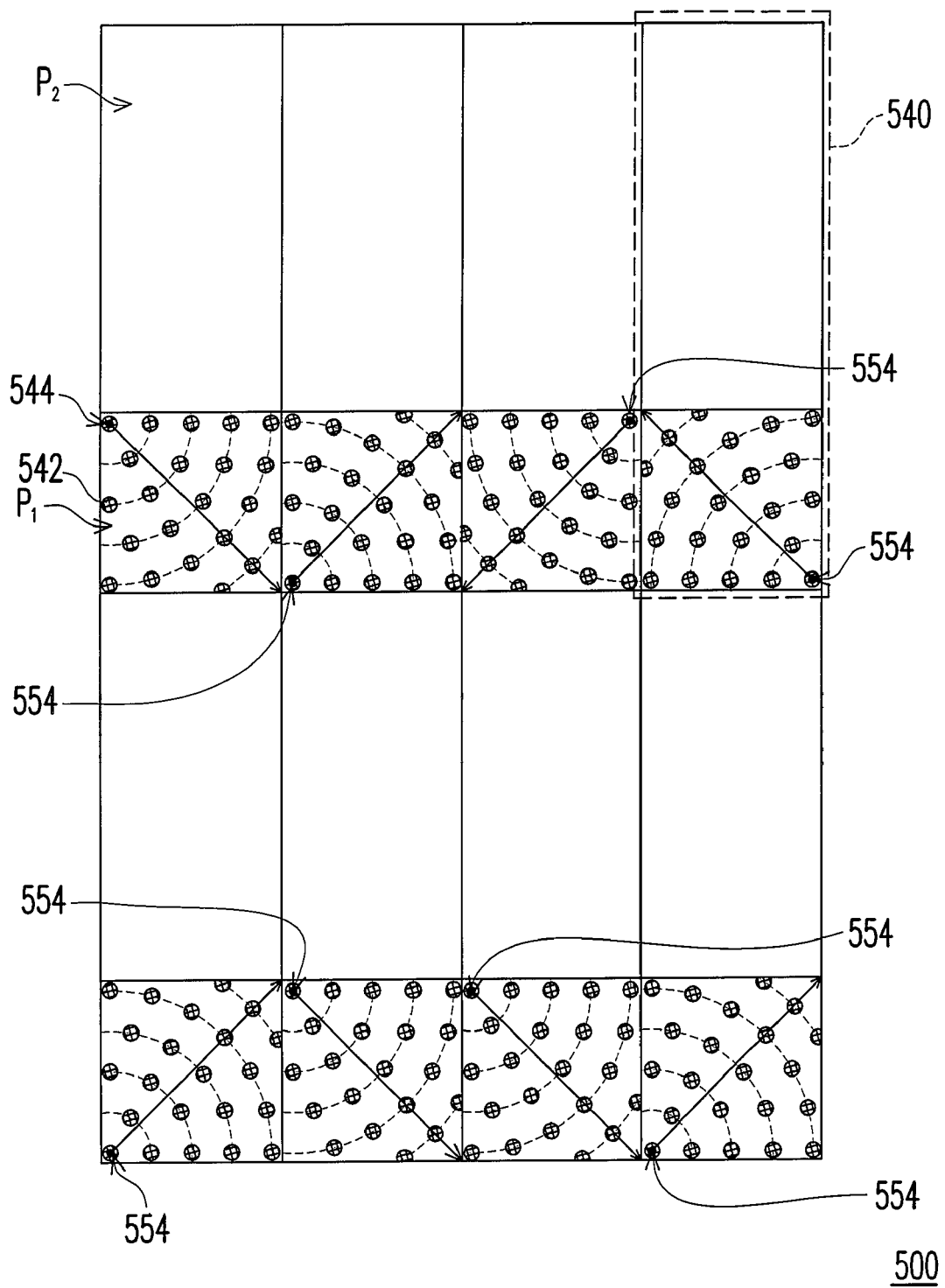

Furthermore, referring to FIG. 6E to FIG. 6G, eight pixel structures 540 of the display panel 500 may be considered as one group. Namely, in the eight closely arranged pixel structures 540, positions of the arc centers 554 of the arc loci 552 formed by the protrudent patterns 542 may be arranged based on other combinations, so as to form the display panel 500 illustrated in FIGS. 6E~6G. Certainly, designs of the aforementioned various display panels 500 are only used for examples, and the number of pixel structures 540 (such as the number of closely arranged pixel structures) considered to be one group for designing the arrangement of the protrudent patterns 542 is not limited by the present invention, and the number of corners of the pixel structures 540 used for functioning as the arc centers of the protrudent patterns 542 is also not limited. It should be noted that in the aforementioned groups of the pixel structures 540, the direction variations of arranged protrudent patterns 542 are nicely complementary, and therefore the display effects of the display panel 500 in all directions is approximately the same. Namely, the display panel 500 may have a better display effect.

It should be noted that a total area of the protrudent patterns 542 substantially occupies 18%~25% of the area of the first display area P1, though the present embodiment is not limited thereof. The total area of the protrudent patterns 542 may substantially occupy 20%~22% of the area of the first display area P1.

Moreover, preferably, top views of the protrudent patterns of the aforementioned embodiments of the present invention are all substantially circles, though the present invention is not limited thereof. The top views of the protrudent patterns may substantially be ellipses, rhombuses, quadrangles, triangles, water drops, pentagons, hexagons, or other polygons.

Figure 7:
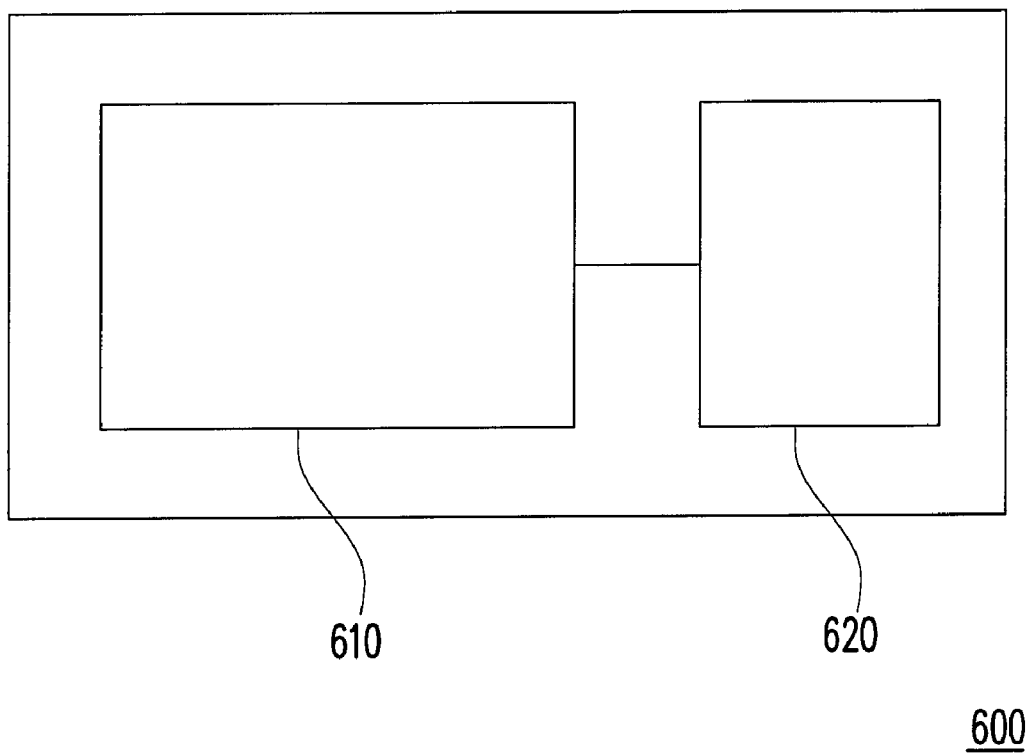
FIG. 7 is a schematic diagram illustrating an electro-optical apparatus according to an embodiment of the present invention.

FIG. 7 is a schematic diagram illustrating an electro-optical apparatus according to an embodiment of the present invention. Referring to FIG. 7, an electro-optical apparatus 600 includes a display panel 610 and an electronic device 620 electrically connected to the display panel 610. The display panel 610 may be the aforementioned display panel 500 having at least one of the aforementioned pixel structures 100c, 200, 300a~300c and 400. Since the display panel 610 has the good reflectivity and the uniformed display viewing angles, and the method for fabricating the protrudent patterns thereof is relatively simple, the electro-optical apparatus 600 then also has the aforementioned advantages.

Furthermore, the display panels 610 are grouped into different types according to different display modes, film layer designs, and display media thereof. When the display media is the liquid crystal molecules, the display panel 610 is then a LCD panel. The commonly used LCD panels are grouped into transmissive display panels, trans-reflective display panels, reflective display panels, color filter on array display panels, array on color filter display panels, vertical alignment (VA) display panels, in plane switch (IPS) display panels, multi-domain vertical alignment (MVA) display panels, twist nematic (TN) display panels, super twist nematic (STN) display panels, patterned-silt vertical alignment (PVA) display panels, super patterned-silt vertical alignment (S-PVA) display panels, advance super view (ASV) display panels, fringe field switching (FFS) display panels, continuous pinwheel alignment (CPA) display panels, axially symmetric aligned micro-cell mode (ASM) display panels, optical compensation banded (OCB) display panels, super in plane switching (S-IPS) display panels, advanced super in plane switching (AS-IPS) display panels, ultra-fringe field switching (UFFS) display panels, polymer stabilized alignment display panels, dual-view display panels, triple-view display panels, three-dimensional display panels, or other types of display panels, or combinations thereof, which are also referred to as non self-luminescent display panels. If the display media is the electro-luminescent material, the display panel 610 is then referred to as an electro-luminescent display panel (for example, a phosphorescence electro-luminescent display panel, a fluorescence electro-luminescent display panel, or combinations thereof), and is also referred to as a self-luminescent display panel, in which the electro-luminescent material may be organic materials, inorganic materials, or combinations thereof. Moreover, size of molecules of the aforementioned materials includes small molecules, polymers, or combinations thereof. If the display medial simultaneously includes the liquid crystal material and the electron luminescent material, the display panel is then referred to as a hybrid display panel or semi self-luminescent display panel.

In addition, the electronic device 620 may be a control device, an operation device, a processing device, an input device, a memory device, a driving device, a luminescent device, a protection device, a sensing device, a detecting device, or other devices or combinations thereof. Overall, the electro-optical apparatus 600 may be a portable product (such as a cell phone, a digital camera, a photo camera, a notebook computer, a game machine, a watch, a music player, an email deliver-receiver, a map navigator, a digital camera, or similar products), a video-audio product (such as a video-audio player, or similar products), a screen, a television, a display board, or a panel within a projector etc. Moreover, the present invention provides a method for fabricating the electro-optical apparatus, which includes the fabrication methods of the display panels of the aforementioned embodiments.

In summary, the pixel structure, the display panel and the electro-optical apparatus of the present invention have at least the following advantages. First, the protrudent patterns arranged in the arc loci are disposed on the pixel structure, and the same arc center of the arc loci is located at one of the corners of the pixel structure. Therefore, the pixel structure may have the good reflectivity. Moreover, in the method for fabricating the pixel structure of the present invention, fabrication of the protrudent patterns is simplified by applying the half-tone mask, and the corresponding fabrication time is reduced accordingly. Furthermore, in the display panel of the present invention, the protrudent patterns of each of the pixel structures are arranged in certain principles, and the arrangement principles of the protrudent patterns of the closely adjacent plurality of pixel structures are different. Therefore, the display panel of the present invention may have the uniformed display viewing angles, especially for the reflective display mode. Moreover, the display panel and the electro-optical apparatus having the above pixel structures may also have the good display effect, and the fabrication methods thereof are also relatively simple.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure, disposed on a substrate, having a plurality of protrudent patterns, and an area where the protrudent patterns are located defines a first display area, and an arrangement of the protrudent patterns approximately forms a plurality of arc loci, wherein the arc loci have a same arc center, and the arc center is located at a corner of the first display area.

2. The pixel structure of claim 1, wherein a total area of the protrudent patterns substantially occupies 18%~25% of an area of the first display area.

3. The pixel structure of claim 1, wherein a curvature radius of each of the arc loci is n*d, where n is a natural number greater than zero, and d is a distance between the arc center and the adjacent arc lotus.

4. The pixel structure of claim 3, wherein at least one protrudent pattern is arranged in each of the arc loci, and a distance between the protrudent patterns respectively on each of arc loci is d.

5. The pixel structure of claim 1, further comprises:
a scan line;
a data line intersected with the scan line;
an active device electrically connected to the scan line and the data line;
a first pixel electrode electrically connected to the active device; and a first dielectric layer disposed on the substrate, wherein the first pixel electrode is conformally disposed on the first dielectric layer, the first dielectric layer has the protrudent patterns, and the first dielectric layer has a first film thickness and a second film thickness substantially less than the first film thickness, such that a difference between the first film thickness and the second film thickness substantially equals to a height of the protrudent patterns.

6. The pixel structure of claim 5, wherein the first pixel electrode is a reflective pixel electrode or a transmissive pixel electrode.

7. The pixel structure of claim 5, further comprises a second pixel electrode electrically connected to the active device, and the second pixel electrode defines a second display area.

8. The pixel structure of claim 7, wherein the first dielectric layer is further disposed between the second pixel electrode and the substrate, and a part of the first dielectric layer covered by the second pixel electrode has approximately the same first film thickness or the second film thickness.

9. The pixel structure of claim 5, further comprises a second dielectric layer disposed between the first dielectric layer and the first pixel electrode, and the second dielectric layer and the first dielectric layer are conformal.

10. The pixel structure of claim 1, further comprises:
a scan line;
a data line intersected with the scan line;
an active device electrically connected to the scan line and the data line; and
a first pixel electrode, electrically connected to the active device, and a part of the first pixel electrode forms the protrudent patterns.

11. The pixel structure of claim 1, further comprises:
a scan line;
a data line intersected with the scan line;
an active device electrically connected to the scan line and the data line;
a first pixel electrode electrically connected to the active device; and
a capacitor electrode, disposed between the substrate and the first pixel electrode, and a part of the capacitor electrode forms the protrudent patterns.

12. A display panel, comprising:
a first substrate;
a second substrate disposed in parallel to the first substrate;
a display media layer disposed between the first substrate and the second substrate; and
a plurality of pixel structures disposed on the first substrate, each of the pixel structures has a plurality of protrudent patterns, and an area where the protrudent patterns are located defines a first display area, and an arrangement of the protrudent patterns approximately forms a plurality of arc loci, wherein the arc loci have a same arc center, and the arc center is located at a corner of the first display area.

13. The display panel of claim 12, wherein the arc center of each of the pixel structures and the arc center of one of an adjacent pixel structures are located at different corners of the corresponding first display area.

14. The display panel of claim 12, wherein a total area of the protrudent patterns of each of the pixel structures substantially occupies 18%~25% of an area of the first display area.

15. The display panel of claim 12, wherein each of the first display areas is substantially a rectangular and has a first corner, a second corner, a third corner, and a fourth corner, wherein the first corner is located opposite to the third corner, and the second corner is located opposite to the fourth corner.

16. The display panel of claim 15, wherein in two adjacent pixel structures, positions of the arc centers are located at the opposite corners.

17. The display panel of claim 15, wherein in four pixel structures, positions of the arc centers are respectively located at the first corner, the second corner, the third corner, and the fourth corner of the corresponding first display area.

18. The display panel of claim 12, wherein a curvature radius of each of the arc loci is n*d, where n is a natural number greater than zero, and d is a distance between the arc center and the adjacent arc lotus.

19. The display panel of claim 18, wherein at least one protrudent pattern is arranged in each of the arc loci, and a distance between the protrudent patterns respectively on each of the arc loci is d.

20. The display panel of claim 12, wherein each of the pixel structures comprises:
a scan line;
a data line intersected with the scan line;
an active device electrically connected to the scan line and the data line;
a first pixel electrode electrically connected to the active device; and
a first dielectric layer disposed on the substrate, the first pixel electrode is conformally disposed on the first dielectric layer, the first dielectric layer has the protrudent patterns, and has a first film thickness and a second film thickness substantially less than the first film thickness, such that a difference between the first film thickness and the second film thickness substantially equals to a height of the protrudent patterns.

21. The display panel of claim 20, wherein the first pixel electrode is a reflective pixel electrode or a transmissive pixel electrode.

22. The display panel of claim 20, wherein each of the pixel structures further comprises a second pixel electrode electrically connected to the active device, and the second pixel electrode defines a second display area.

23. The display panel of claim 22, wherein the first dielectric layer is further disposed between the second pixel electrode and the first substrate, and a part of the first dielectric layer covered by the second pixel electrode has approximately the same first film thickness or the second film thickness.

24. The display panel of claim 22, further comprising an additional layer disposed between the second substrate and the display media layer, and the additional dielectric layer is located at the first display area is adapted to adjust a thickness of the display media layer located above the first pixel electrodes.

25. The display panel of claim 20, wherein each of the pixel structures further comprises a second dielectric layer disposed between the first dielectric layer and the first pixel electrode, and the second dielectric layer and the first dielectric layer are conformal.

26. The display panel of claim 12, wherein each of the pixel structures comprises:
a scan line;
a data line intersected with the scan line;
an active device electrically connected to the scan line and the data line; and
a first pixel electrode electrically connected to the active device, and a part of the first pixel electrode forms the protrudent patterns.

27. The display panel of claim 12, wherein each of the pixel structures comprises:
- a scan line;
- a data line intersected with the scan line;
- an active device electrically connected to the scan line and the data line;
- a first pixel electrode electrically connected to the active device; and
- a capacitor electrode disposed between the first substrate and the first pixel electrode, and a part of the capacitor electrode forms the protrudent patterns.

28. The display panel of claim 12, further comprising at least a spacer disposed between the first substrate and the second substrate.

29. A method for fabricating a display panel, comprising:
- providing a first substrate;
- forming a plurality of pixel structures on the first substrate, each of the pixel structures having a plurality of protrudent patterns, an area where the protrudent patterns are located defines a first display area, and an arrangement of the protrudent patterns approximately forms a plurality of arc loci, wherein the arc loci have a same arc center, and the arc center is located at a corner of the first display area;
- providing a second substrate; and
- forming a display media layer between the first substrate and the second substrate.

30. The method of claim 29, wherein the formation of the plurality of protrudent patterns comprises allocating the arc center of each of the pixel structures and the arc center of one of the adjacent pixel structure located at different corners of the corresponding first display areas.

31. The method of claim 29, wherein the formation of each of the pixel structures comprises:
- forming a scan line and data line on the first substrate, and the scan line and the data line are intersected;
- forming an active device on the first substrate, and the active device is electrically connected to the scan line and the data line;
- forming a first dielectric layer on the first substrate, the first dielectric layer has the plurality of protrudent patterns, and the first dielectric layer has a first film thickness and a second film thickness substantially less than the first film thickness, such that a difference between the first film thickness and the second film thickness substantially equals to a height of the protrudent patterns; and
- forming a first pixel electrode on the first substrate, the first pixel electrode is electrically connected to the active device, and the first pixel electrode is conformally disposed on the first dielectric layer.

32. The method of claim 31, wherein the formation of the first dielectric layer comprising:
- forming a dielectric material layer on the first substrate; and
- performing a patterning process by utilizing a half-tone mask adapted patterning the dielectric material layer, wherein the half-tone mask has an opaque area, a transparent area, and a partially transparent area, the transparent area is located above a part of the active device, the opaque area and the partially transparent area are located within the first display area, and the dielectric material layer located below the opaque area is patterned to form the protrudent patterns.

33. The method of claim 32, further comprises forming a simulation test pattern on the first substrate as performing the patterning process.

34. The method of claim 32, wherein a transmissivity of the partially transparent area is substantially between 10%~30%.

35. The method of claim 32, wherein the formation of each of the pixel structures further comprises forming a second dielectric layer between the first dielectric layer and the first pixel electrode, and the second dielectric layer and the first dielectric layer are conformal.

36. The method of claim 32, wherein the formation of each of the pixel structures further comprises forming a second pixel electrode on the first substrate, the second pixel electrode is electrically connected to the active device, and the second pixel electrode defines a second display area.

37. The method of claim 36, wherein the partially transparent area of the half-tone mask is further located above the second display area.

38. The method of claim 36, wherein one of the opaque area and the transparent area of the half-tone mask is further located above the second display area.

39. The method of claim 36, further comprising forming an additional dielectric layer on the second substrate, and the additional layer is located within the first display area.

40. The method of claim 29, wherein the formation of each of the pixel structures comprises:
- forming a scan line and a data line on the first substrate, and the scan line and the data line are intersected;
- forming an active device on the first substrate, and the active device is electrically connected to the scan line and the data line;
- forming a first pixel electrode on the first substrate, and the first pixel electrode is electrically connected to the active device; and
- forming a capacitor electrode on the first substrate, and the capacitor electrode is located between the first pixel electrode and the first substrate, and a part of the capacitor electrode forms the protrudent patterns.

41. The method of claim 29, further comprising forming at least a spacer between the first substrate and the second substrate.

42. An electro-optical apparatus incorporating the display panel of claim 12.

43. A method for fabricating an electro-optical apparatus incorporating the method of claim 29.

* * * * *